US008746704B2

(12) United States Patent
Dejonghe et al.

(10) Patent No.: US 8,746,704 B2
(45) Date of Patent: *Jun. 10, 2014

(54) WORK-HOLDING CHUCK WITH QUICK-RELEASE JAWS

(71) Applicant: Forkardt Inc., Elmira, NY (US)

(72) Inventors: Thomas H. Dejonghe, Sterling Heights, MI (US); Douglas L. Roush, Traverse City, MI (US); Thomas M. Grobbel, Ortonville, MI (US)

(73) Assignee: Forkardt Inc., Elmira, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/962,657

(22) Filed: Aug. 8, 2013

(65) Prior Publication Data

US 2013/0320638 A1 Dec. 5, 2013

Related U.S. Application Data

(60) Division of application No. 12/569,840, filed on Sep. 29, 2009, now Pat. No. 8,534,677, which is a continuation-in-part of application No. 12/434,762, filed on May 4, 2009, now Pat. No. 8,528,914, which is a continuation-in-part of application No. 11/711,910, filed on Feb. 27, 2007, now Pat. No. 7,594,665.

(51) Int. Cl.
*B23B 31/39* (2006.01)
*B23B 31/175* (2006.01)

(52) U.S. Cl.
USPC .......................... 279/124; 279/109

(58) Field of Classification Search
USPC .......................... 279/109, 118, 123, 124, 901
IPC .......................... B23B 31/39, 31/175
See application file for complete search history.

(56) References Cited

U.S. PATENT DOCUMENTS

| 185,838 A | 1/1877 | Saunders |
| RE8,793 E | 7/1879 | Pratt |
| 2,576,350 A | 11/1951 | Mazzola |
| 3,069,181 A | 12/1962 | Hohwart et al. |
| 3,082,015 A | 3/1963 | Hohwart et al. |
| 3,093,366 A | 6/1963 | Ernest |
| 3,099,457 A | 7/1963 | Hohwart et al. |
| 3,104,886 A | 9/1963 | Hohwart et al. |
| 3,219,356 A | 11/1965 | Wilterdink et al. |
| 3,365,206 A | 1/1968 | Hohwart et al. |
| 3,380,747 A | 4/1968 | Hohwart et al. |
| 3,423,098 A | 1/1969 | Toth et al. |
| 3,472,526 A | 10/1969 | Hohwart |
| 3,656,773 A | 4/1972 | Blattry et al. |
| 3,682,491 A | 8/1972 | Sakazaki et al. |
| 3,704,022 A | 11/1972 | Blattry et al. |

(Continued)

FOREIGN PATENT DOCUMENTS

| DE | 3322201 | 1/1985 |
| DE | 3425603 | 2/1986 |

(Continued)

*Primary Examiner* — Eric A Gates
(74) *Attorney, Agent, or Firm* — Pillsbury Winthrop Shaw Pittman LLP

(57) ABSTRACT

A system, in certain embodiments, includes a wedge-lock coupling configured to connect a jaw to an actuator arm of a chuck. The wedge-lock coupling includes a wedge portion having a path of travel between a release position and a lock position, and a locking direction along the path of travel gradually wedges the wedge portion between the actuator arm and the jaw.

10 Claims, 30 Drawing Sheets

(56) References Cited

U.S. PATENT DOCUMENTS

| | | |
|---|---|---|
| 3,810,703 A | 5/1974 | Pasbrig |
| 4,097,053 A | 6/1978 | Steinberger |
| 4,136,588 A | 1/1979 | Roder |
| 4,200,300 A | 4/1980 | Rohm |
| 4,240,645 A | 12/1980 | Rohm |
| 4,243,237 A | 1/1981 | Rohm |
| 4,362,306 A | 12/1982 | Rohm |
| 4,465,289 A | 8/1984 | Banks |
| 4,507,031 A | 3/1985 | Hiestand |
| 4,639,001 A | 1/1987 | Berardo |
| 4,667,971 A | 5/1987 | Norton et al. |
| 4,690,416 A | 9/1987 | Rohm |
| 4,725,065 A | 2/1988 | Hiestand |
| 4,763,906 A | 8/1988 | Barbieux |
| 4,969,654 A | 11/1990 | Theodolin |
| 5,015,003 A | 5/1991 | Ramunas |
| 5,052,700 A | 10/1991 | Howard et al. |
| 5,060,957 A | 10/1991 | Stolzenberg et al. |
| 5,076,596 A | 12/1991 | Jaggers |
| 5,129,662 A | 7/1992 | Kempken |
| 5,135,242 A | 8/1992 | Toth |
| 5,158,307 A | 10/1992 | Toyano et al. |
| 5,174,589 A | 12/1992 | Gulde |
| 5,184,833 A | 2/1993 | Cross et al. |
| 5,322,305 A | 6/1994 | Cross et al. |
| 5,330,205 A | 7/1994 | Norton |
| 5,409,242 A | 4/1995 | Gonnocci |
| 5,524,910 A | 6/1996 | Chase et al. |
| 5,630,594 A | 5/1997 | Bronzino et al. |
| 5,716,058 A | 2/1998 | Bronzino et al. |
| 5,845,912 A | 12/1998 | Grupa |
| 6,145,850 A | 11/2000 | Rehm |
| 6,241,261 B1 | 6/2001 | Rehm |
| 6,264,210 B1 | 7/2001 | Difasi et al. |
| 6,354,606 B1 | 3/2002 | Finn, III |
| 6,371,493 B1 | 4/2002 | Barbieux |
| 6,375,197 B1 | 4/2002 | Barbieux |
| 6,454,278 B1 | 9/2002 | Wrobel et al. |
| 6,474,658 B2 | 11/2002 | Hanai |
| 6,491,305 B2 | 12/2002 | Sida |
| 6,655,699 B2 | 12/2003 | Grobbel |
| 6,837,499 B2 | 1/2005 | Rohm |
| 7,516,964 B2 | 4/2009 | Ubele et al. |
| 7,594,665 B2 | 9/2009 | Crowley et al. |
| 7,862,051 B2 | 1/2011 | Rehm et al. |
| 7,954,825 B2 | 6/2011 | Crowley et al. |
| 8,221,296 B2 | 7/2012 | Hildebrandt et al. |
| 8,272,646 B2 | 9/2012 | Fink |
| 2001/0011800 A1 | 8/2001 | Hanai |
| 2003/0160400 A1 | 8/2003 | Rohm et al. |
| 2009/0206560 A1 | 8/2009 | Crowley et al. |
| 2010/0038867 A1 | 2/2010 | Dejonghe et al. |

FOREIGN PATENT DOCUMENTS

| | | |
|---|---|---|
| DE | 3512929 | 10/1986 |
| DE | 3603459 | 8/1987 |
| DE | 29810720 | 12/1998 |
| EP | 0 047 096 | 3/1982 |
| EP | 0 111 787 | 6/1984 |
| EP | 0 251 266 | 1/1988 |
| EP | 1 022 080 | 7/2000 |
| FR | 2 373 351 | 8/1978 |
| JP | 56-163808 | 12/1981 |
| JP | 61-244401 | 10/1986 |
| JP | 01-172625 | 7/1989 |
| JP | 01-321104 | 12/1989 |
| JP | 03-019704 | 1/1991 |
| JP | 08-229712 | 9/1996 |
| JP | 11-070402 | 3/1999 |
| JP | 11-165205 | 6/1999 |
| JP | 2001-219309 | 8/2001 |
| JP | 2006-102858 | 4/2006 |
| WO | WO 03/047812 | 6/2003 |
| WO | WO 2008/049621 | 5/2008 |

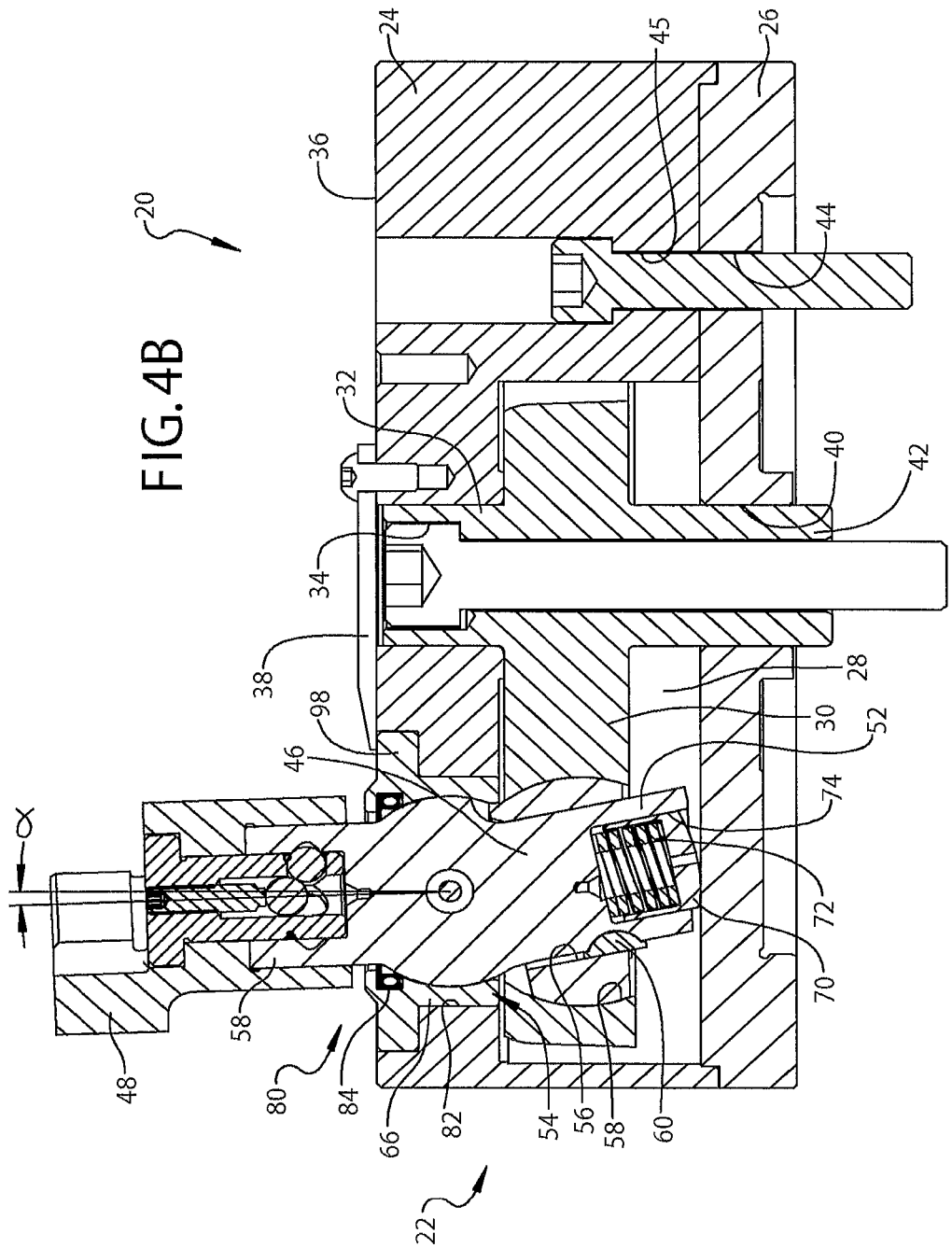

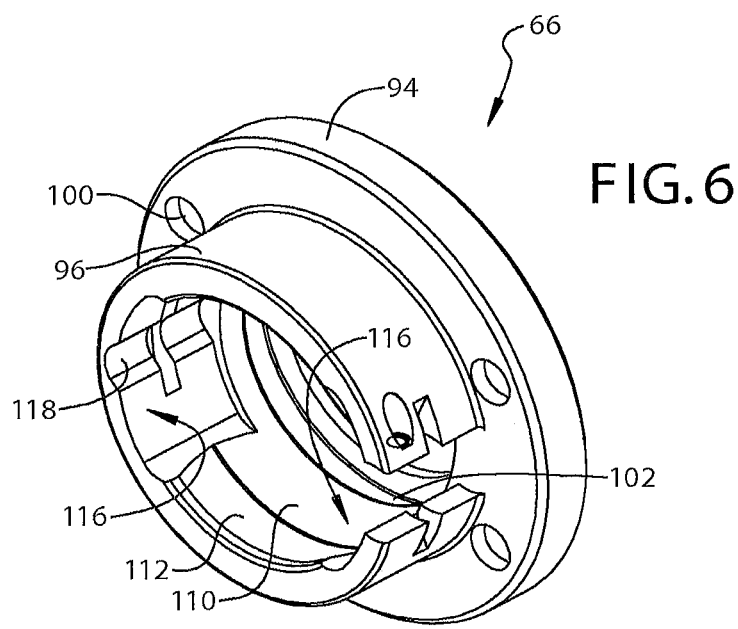
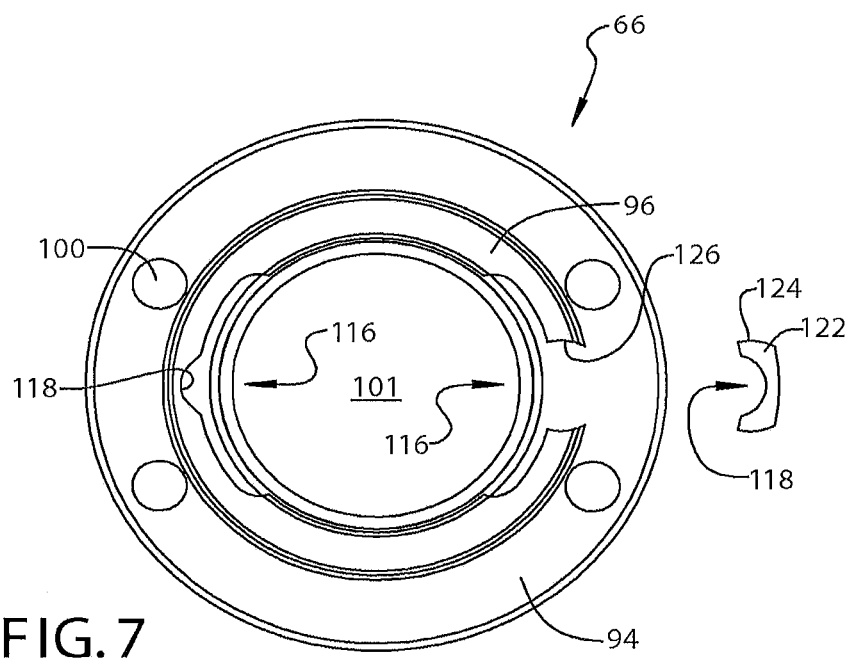

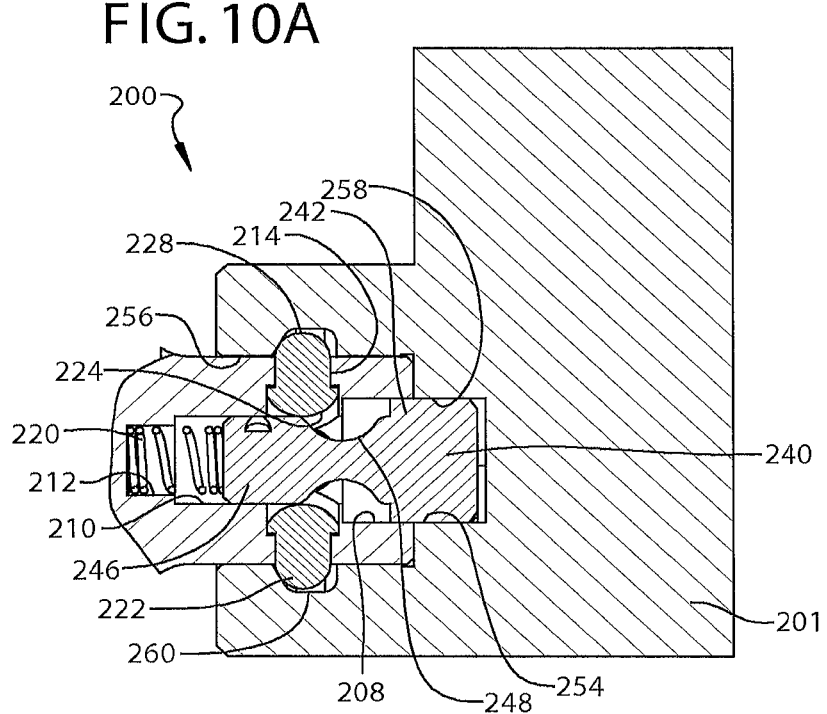
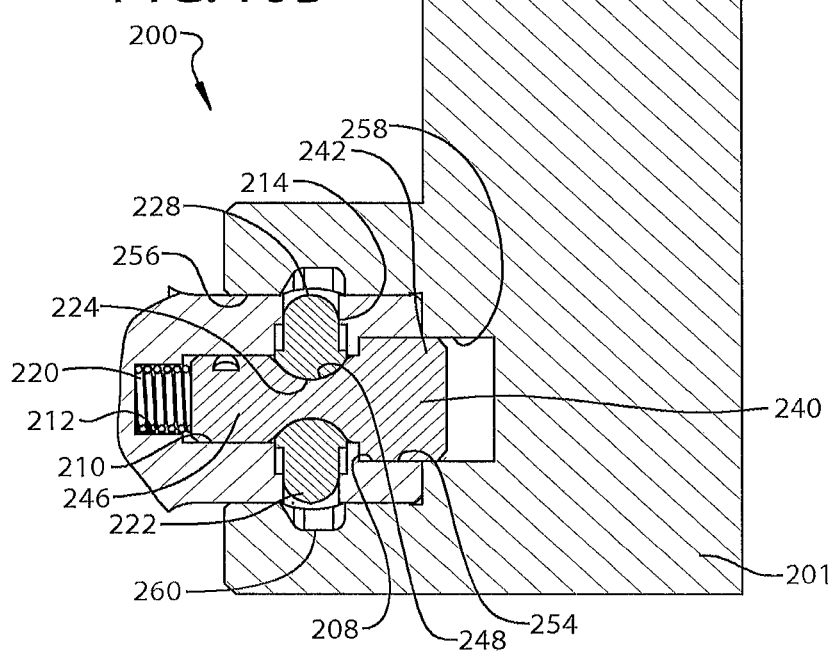

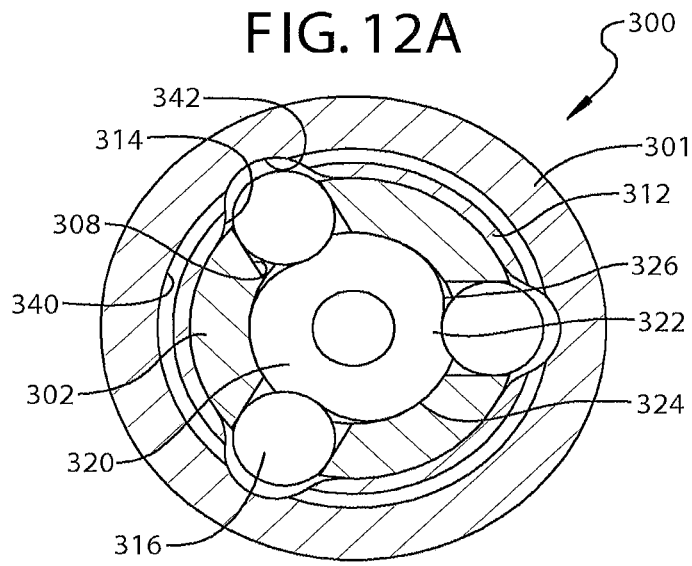
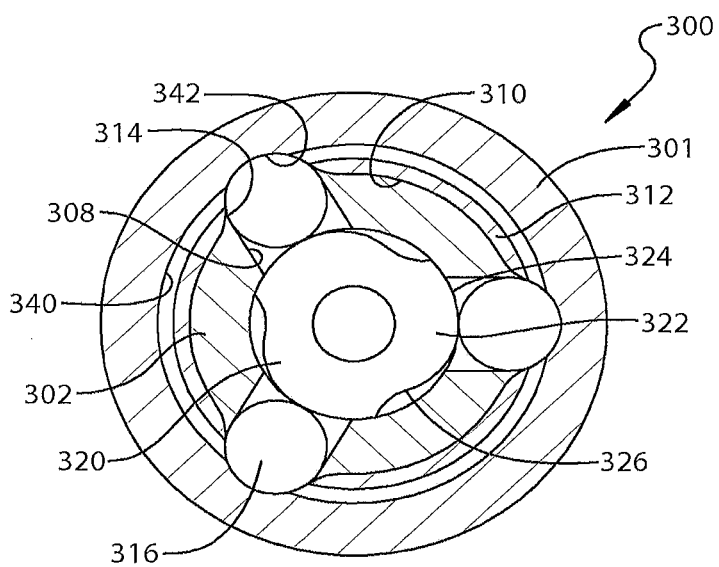

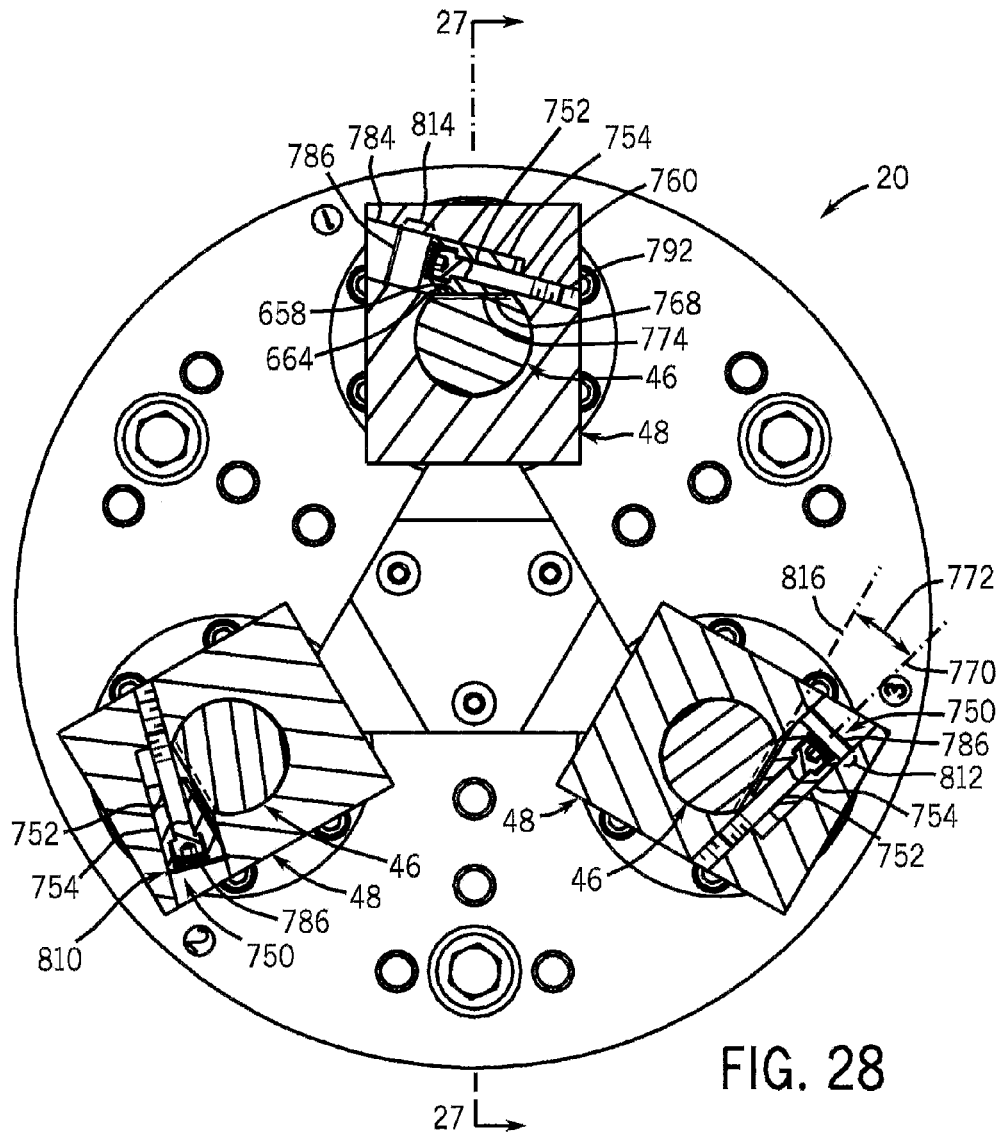
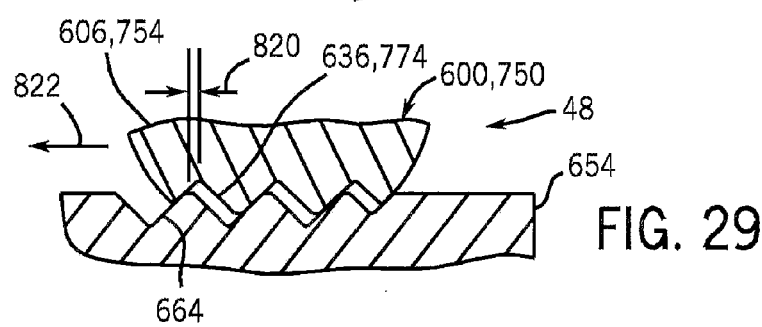
FIG. 28
FIG. 29

US 8,746,704 B2

WORK-HOLDING CHUCK WITH QUICK-RELEASE JAWS

CROSS REFERENCE TO RELATED APPLICATIONS

This application is a divisional of U.S. patent application Ser. No. 12/569,840, entitled "Work-Holding Chuck with Quick-Release Jaws", filed Sep. 29, 2009, which is herein incorporated by reference in its entirety, which is a continuation-in-part of U.S. patent application Ser. No. 12/434,762, entitled "Quick-Release Jaws with Single-Piece Bearing Chuck", filed May 4, 2009, which is herein incorporated by reference in its entirety, which is a continuation-in-part of U.S. patent application Ser. No. 11/711,910, entitled "Quick-Release Jaws with Single-Piece Bearing Chuck", filed Feb. 27, 2007, and issued as U.S. Pat. No. 7,594,665, on Sep. 29, 2009, which is herein incorporated by reference in its entirety.

BACKGROUND

The invention relates generally to a work-holding chuck with quick-release jaws.

An adjustable chuck of the type in widespread use for gripping workpieces of different sizes typically includes a plurality of jaws that are radially movable to grip and release a workpiece. The jaws are typically configured for retaining a specific workpiece. Thus, the jaws are changed to grip different workpieces. Unfortunately, the process of changing the jaws is time consuming. Therefore, reducing jaw reconfiguration time may improve operational efficiency of the machining apparatus to which the chuck is attached.

BRIEF DESCRIPTION

A system, in certain embodiments, includes a wedge-lock coupling configured to connect a jaw to an actuator arm of a chuck. The wedge-lock coupling includes a wedge portion having a path of travel between a release position and a lock position, and a locking direction along the path of travel gradually wedges the wedge portion between the actuator arm and the jaw.

DRAWINGS

These and other features, aspects, and advantages of the present invention will become better understood when the following detailed description is read with reference to the accompanying drawings in which like characters represent like parts throughout the drawings, wherein.

Figure 2:
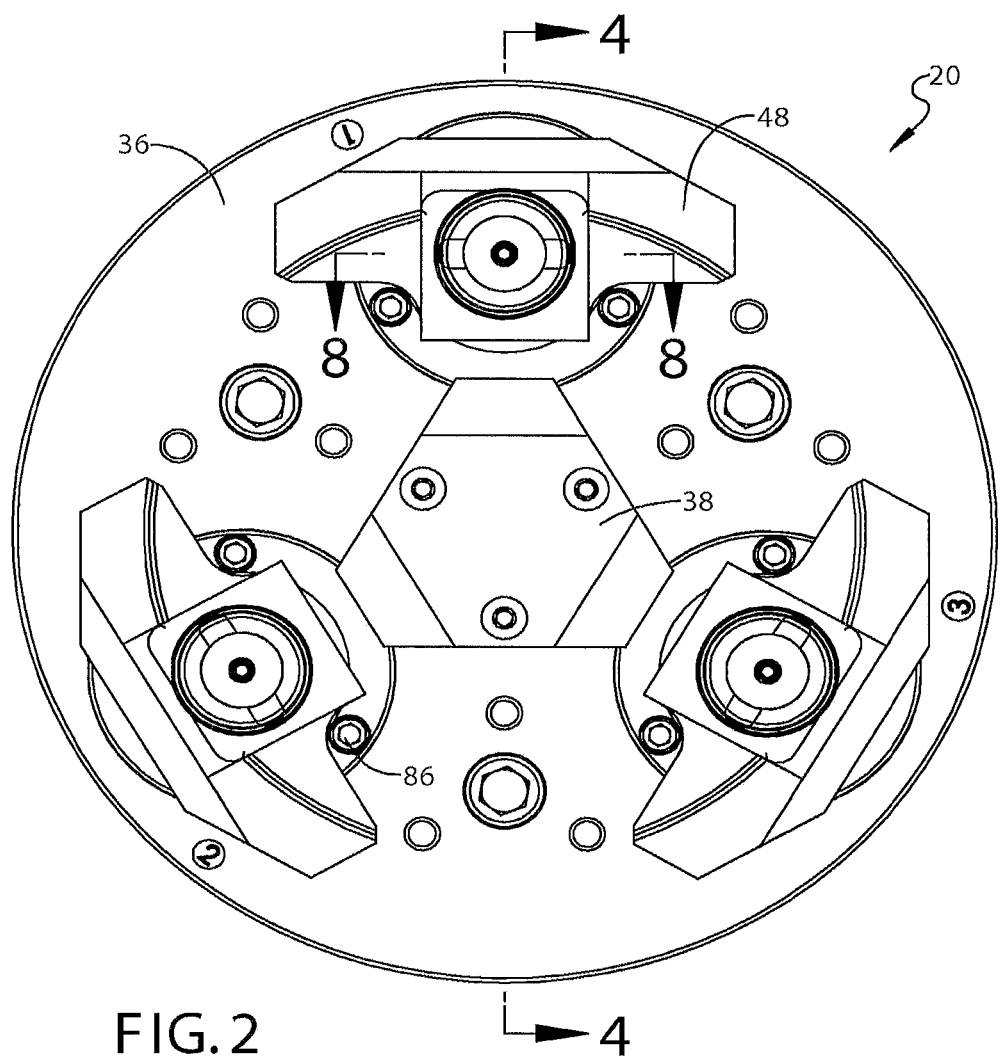
FIG. 2 is a top plan view of an embodiment of the chuck of FIG. 1B.
Figure 3:
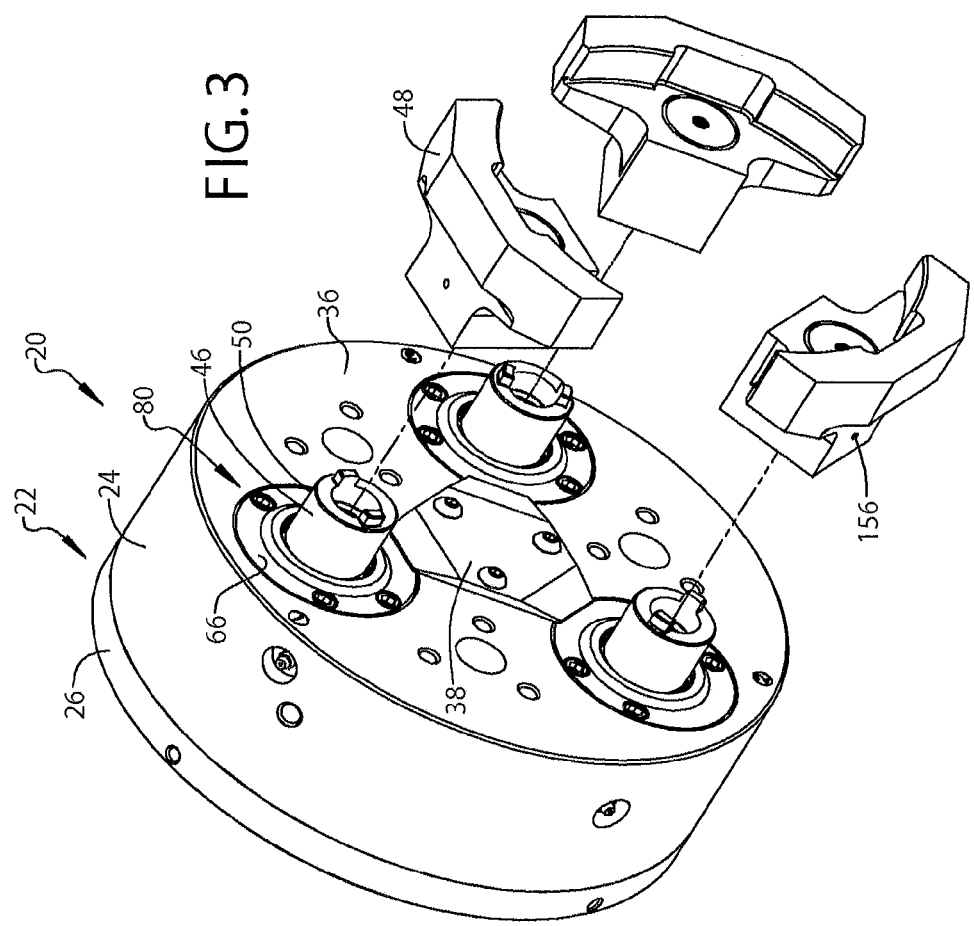
FIG. 3 is another perspective view of an embodiment of the chuck of FIG. 1B showing the jaws uncoupled from the actuator arms.
Figure 4A:
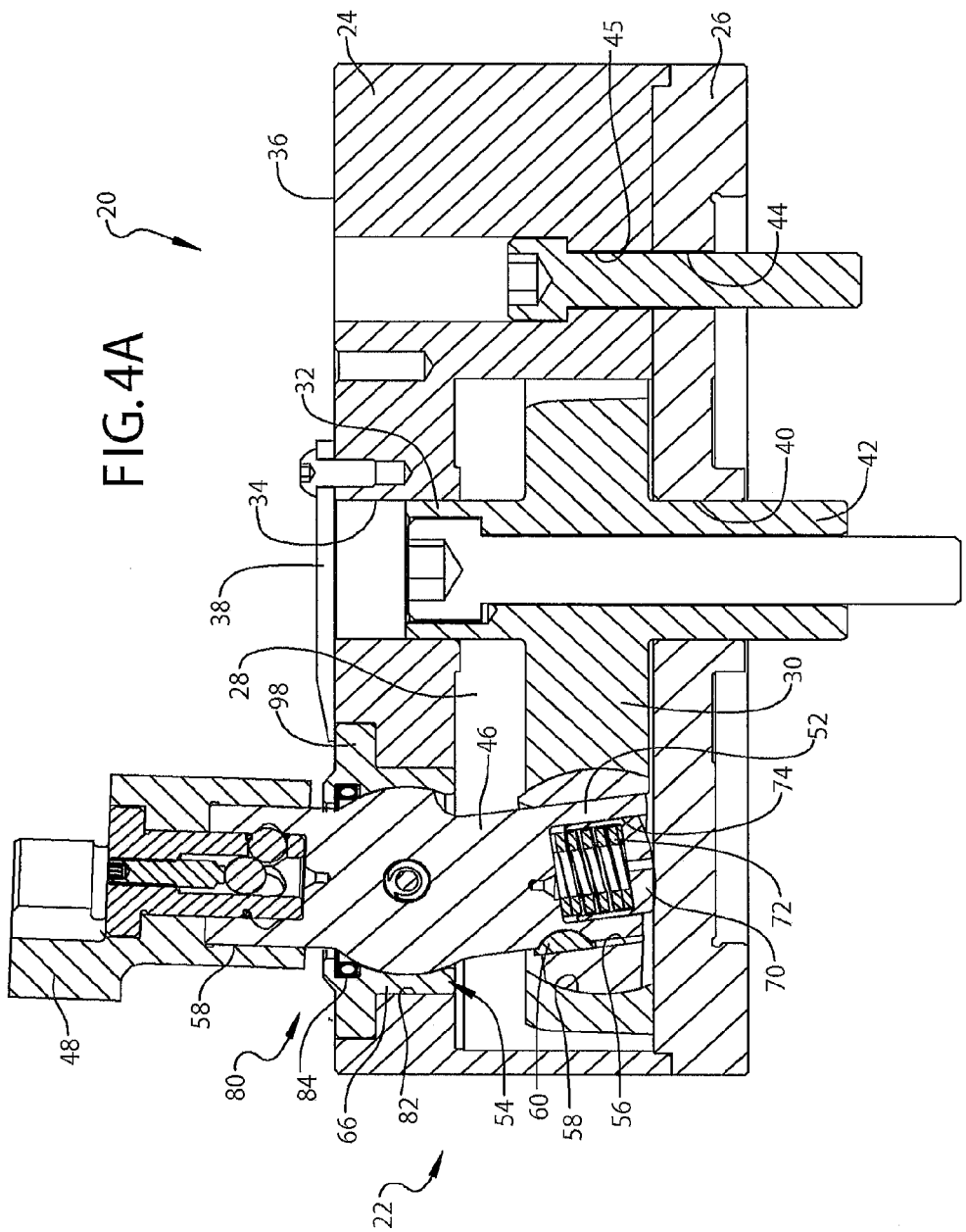
Figure 5:
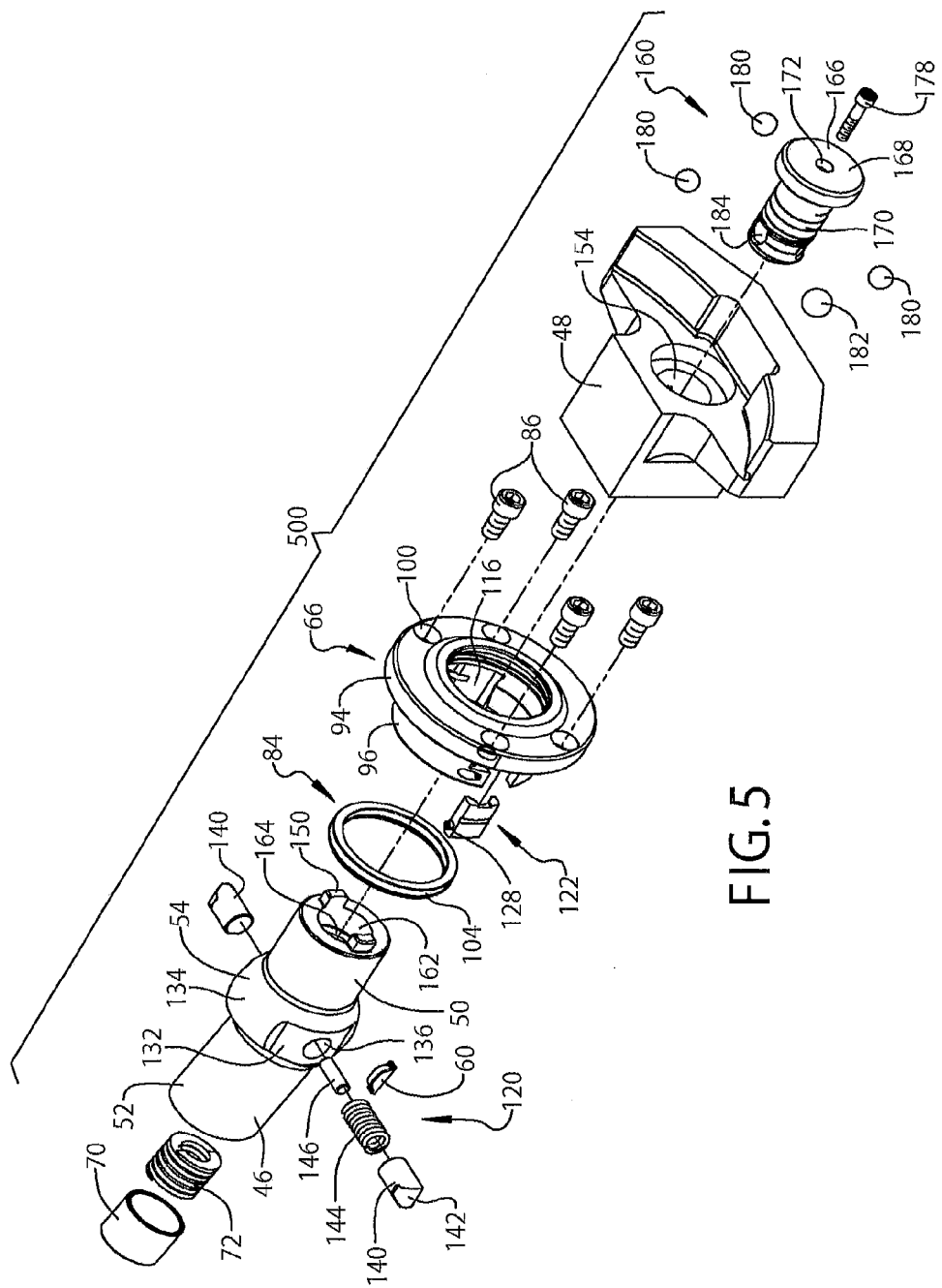
Figure 8A:
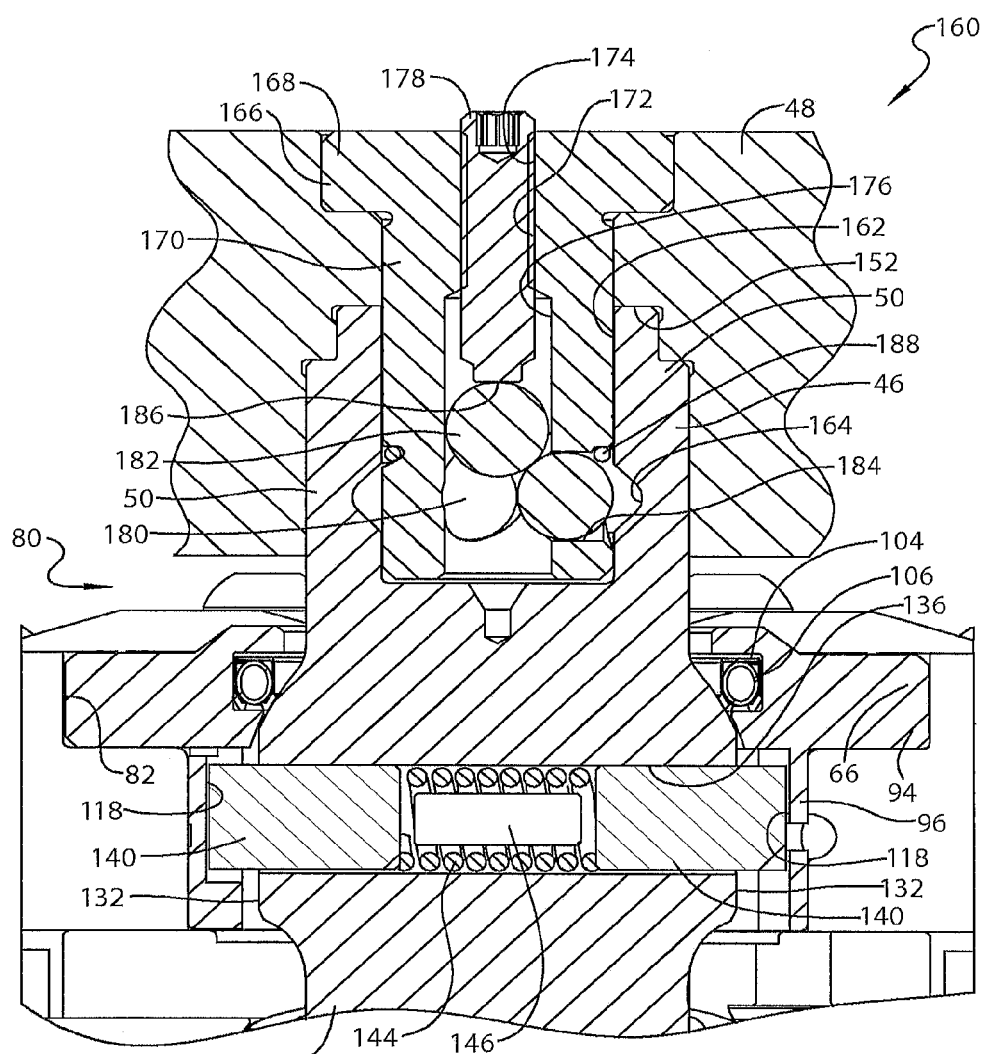
Figure 9:
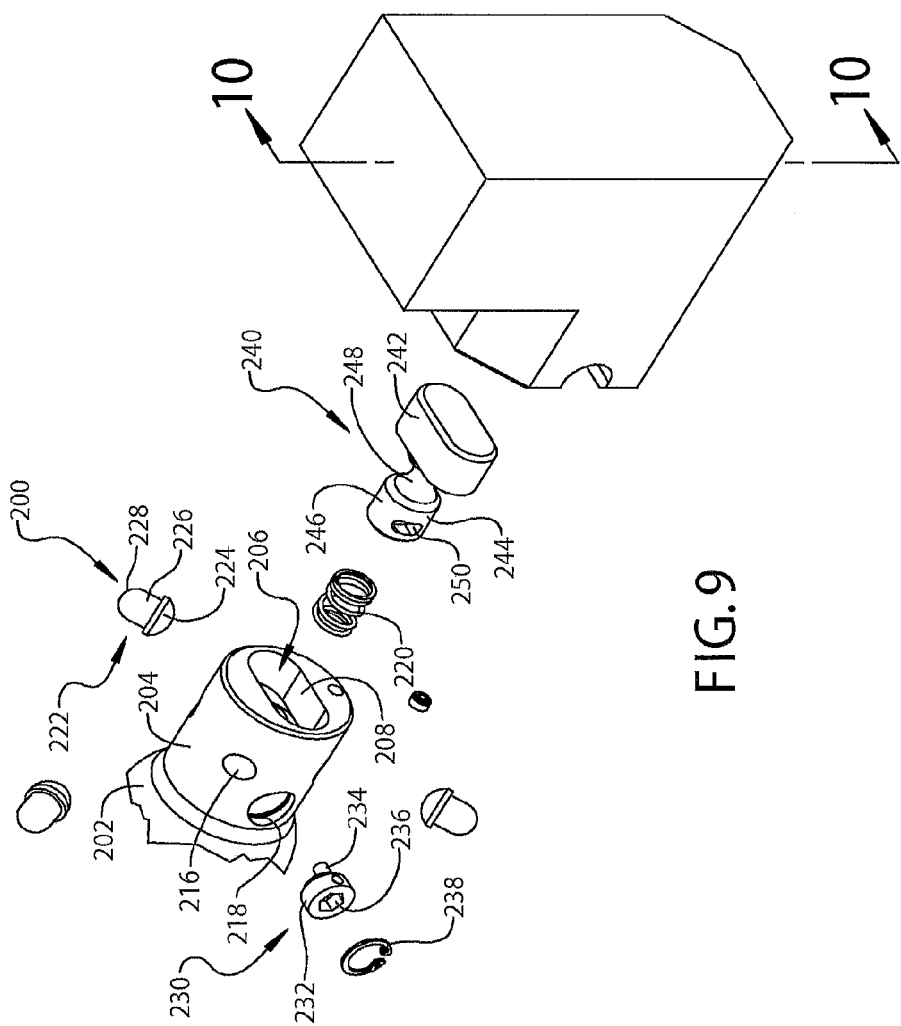
Figure 11:
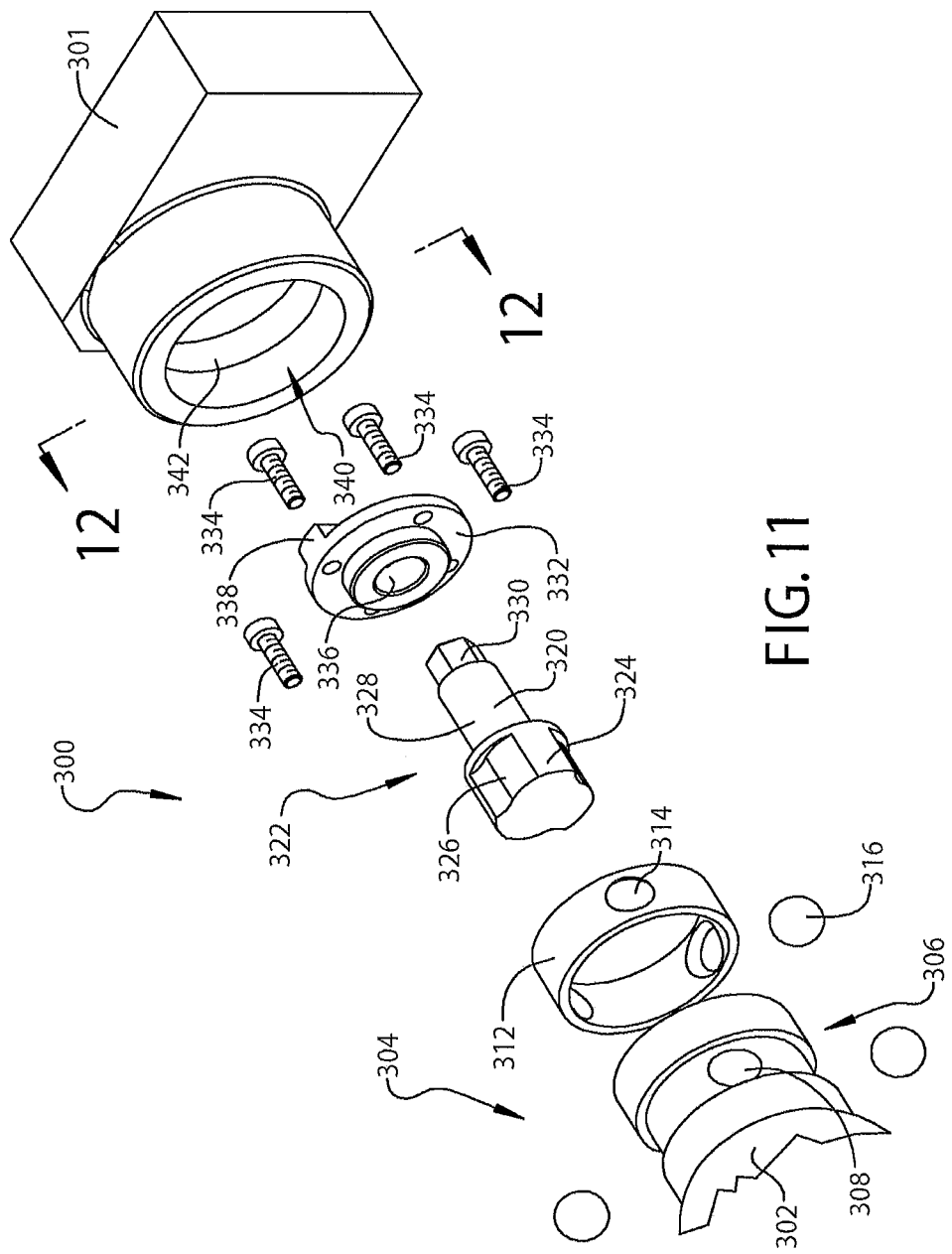
Figure 13:
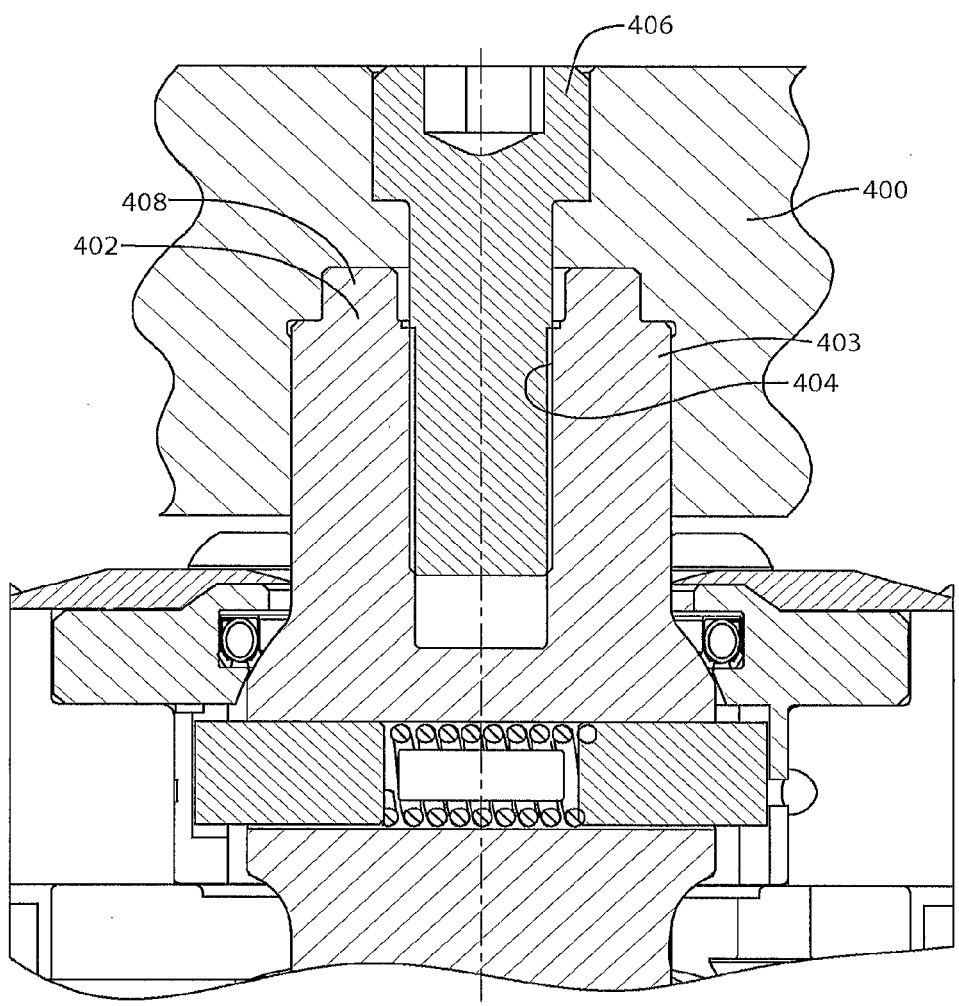
Figure 14:
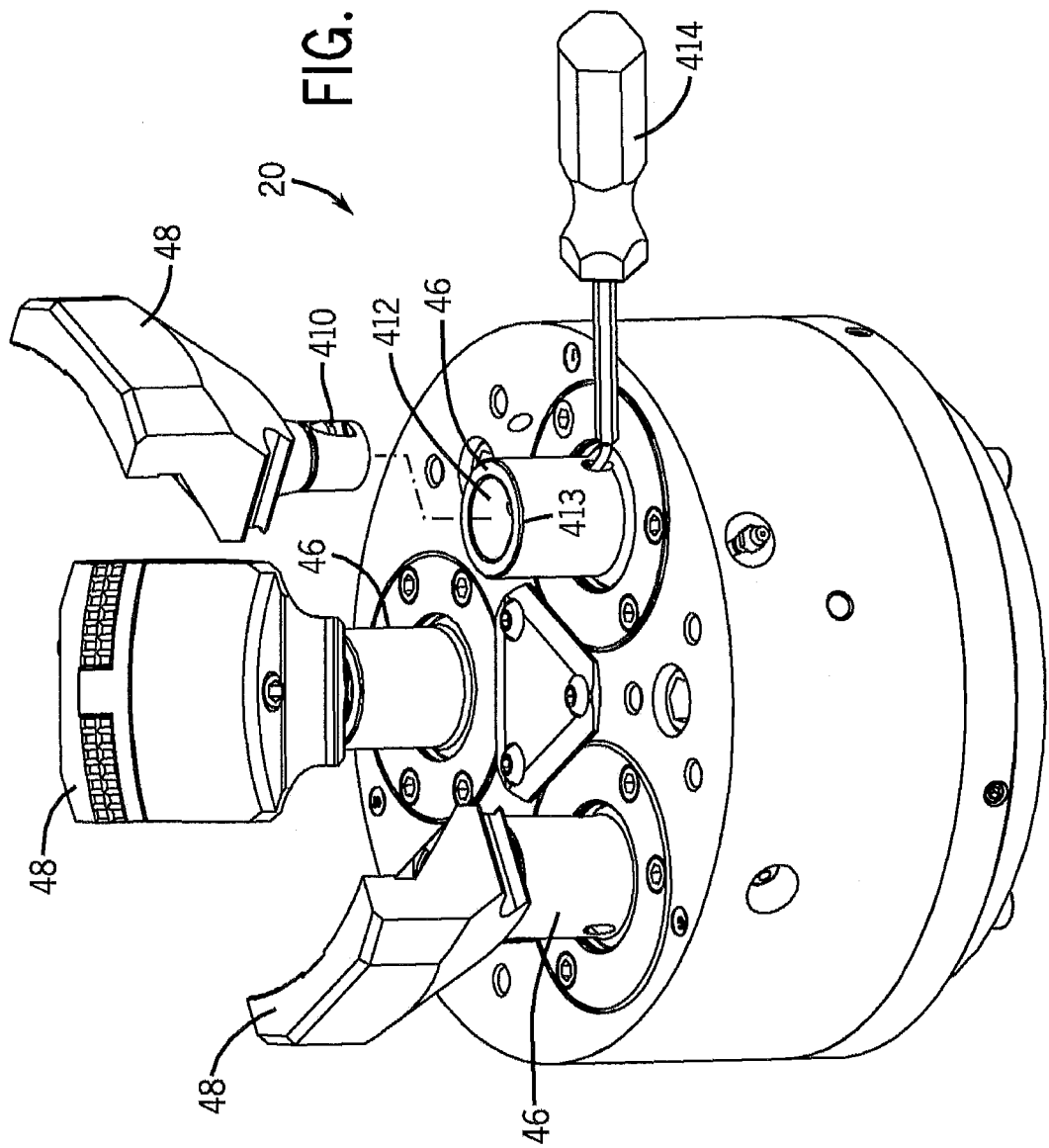
Figure 15:
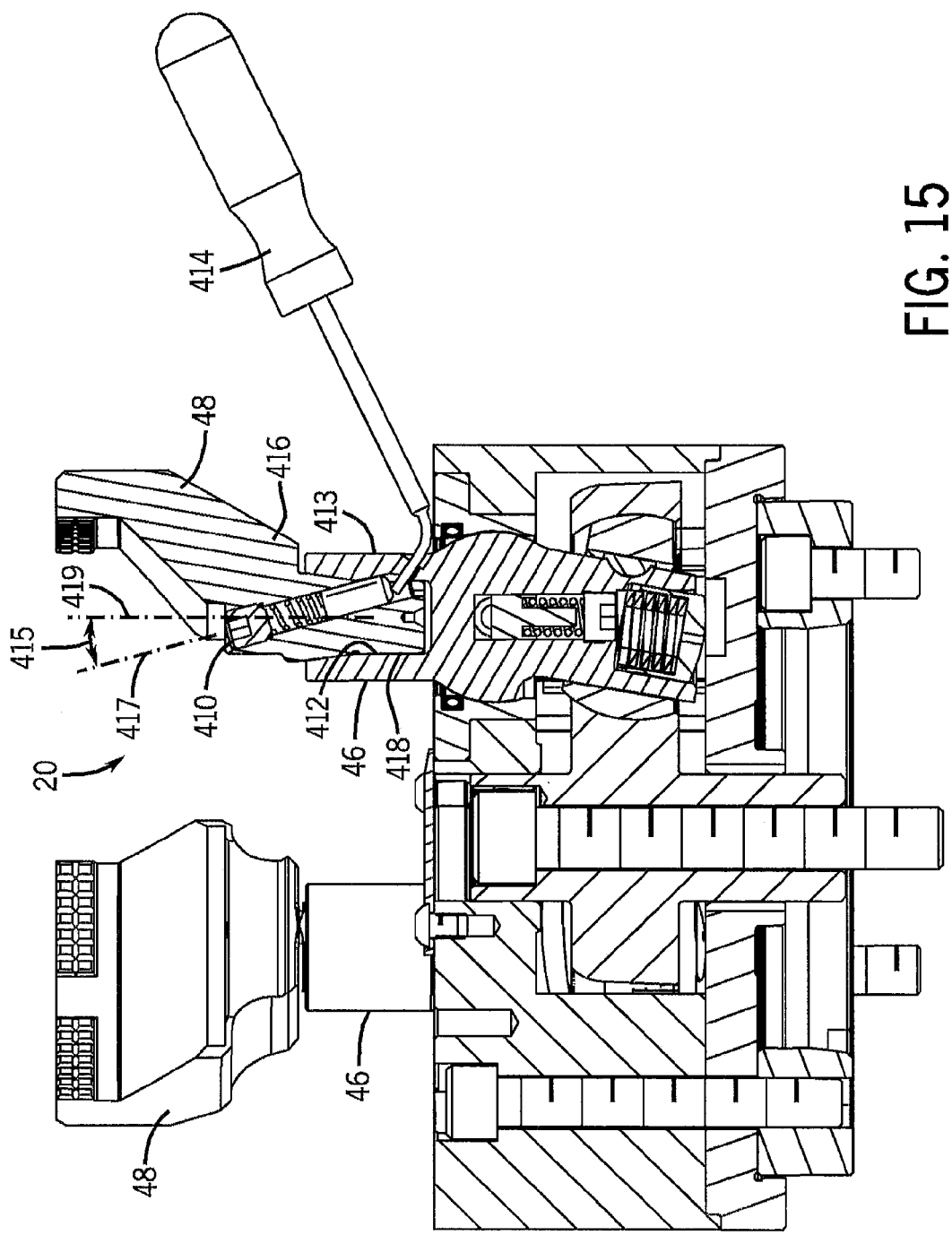
Figure 16:
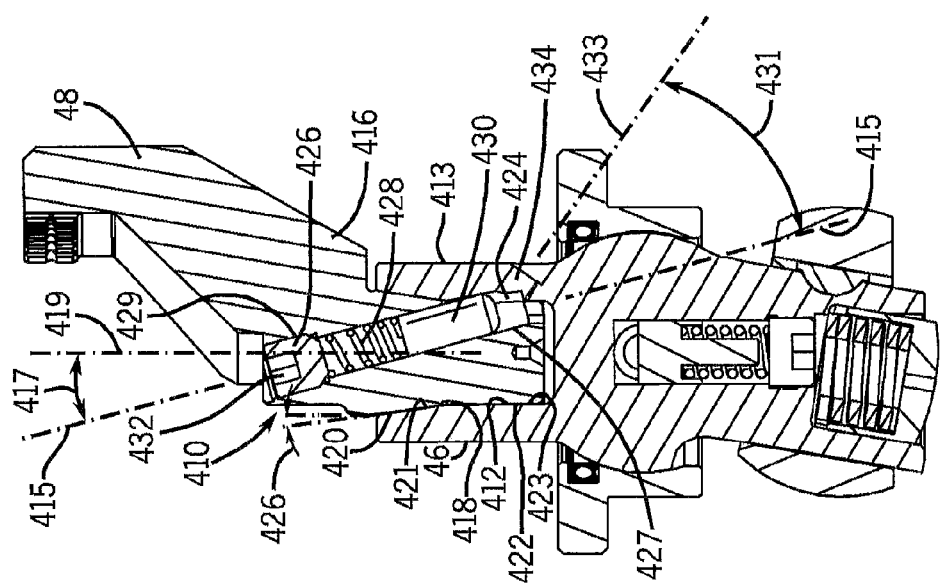
Figure 17:
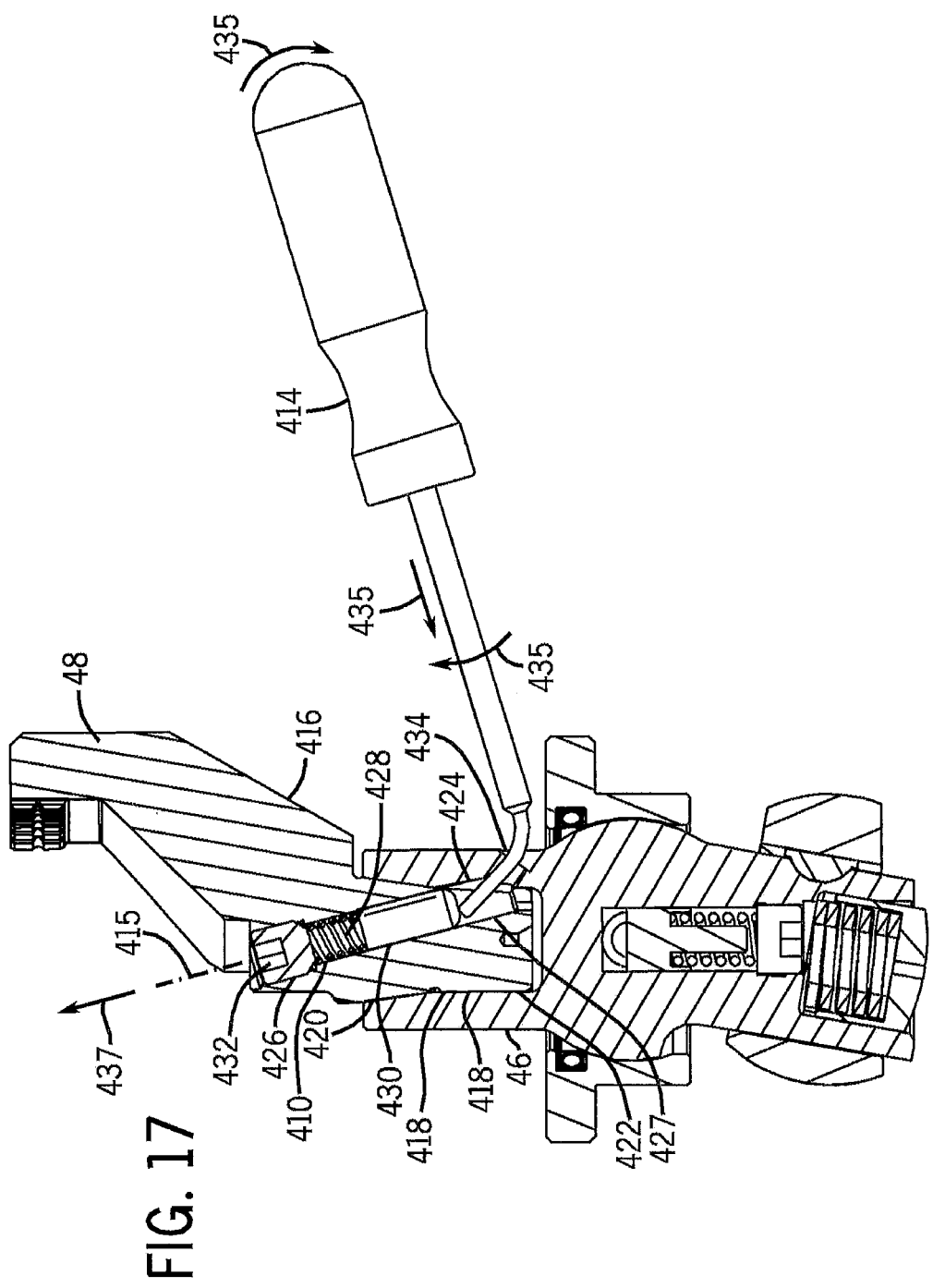
Figure 18:
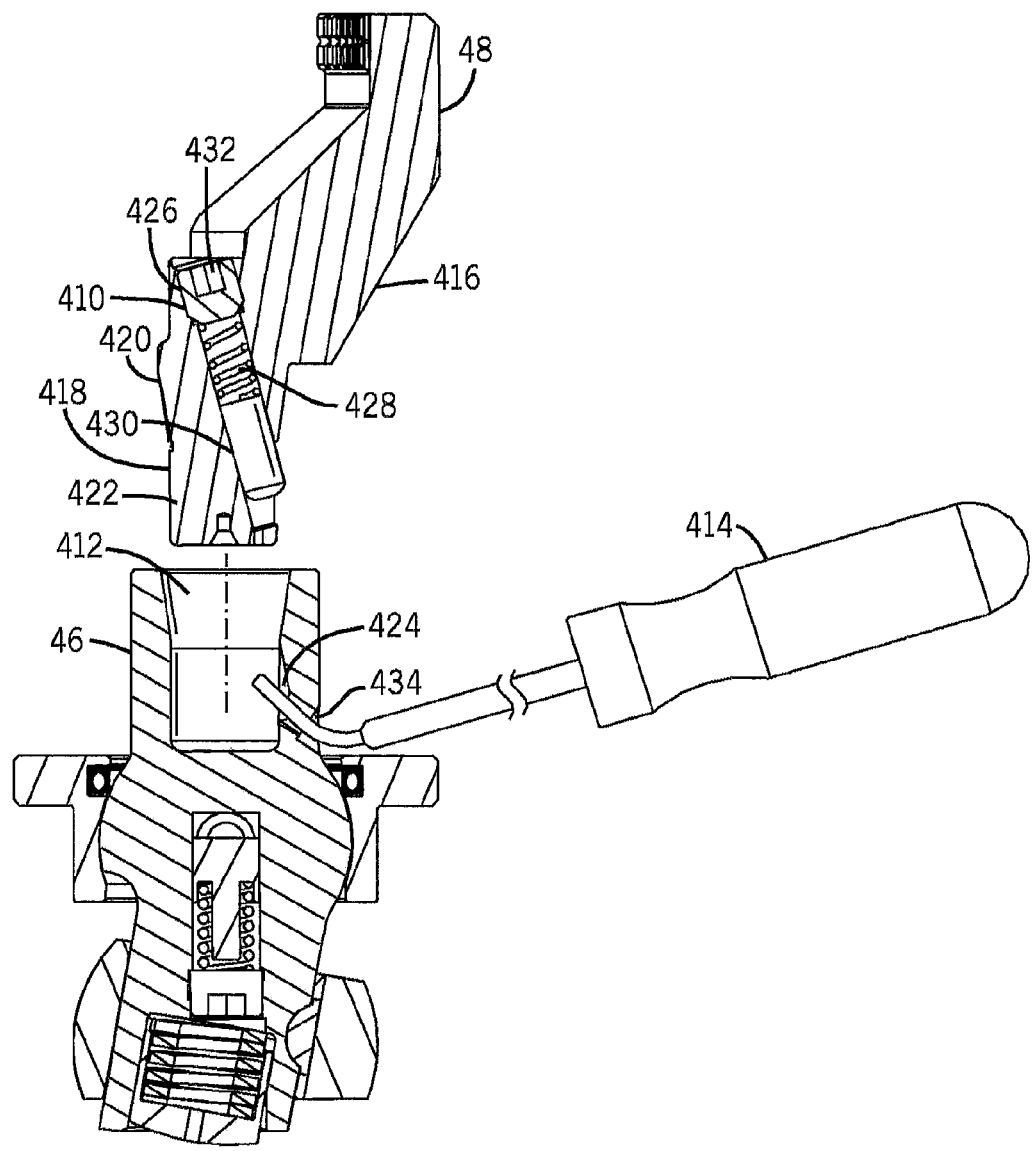
Figure 19:
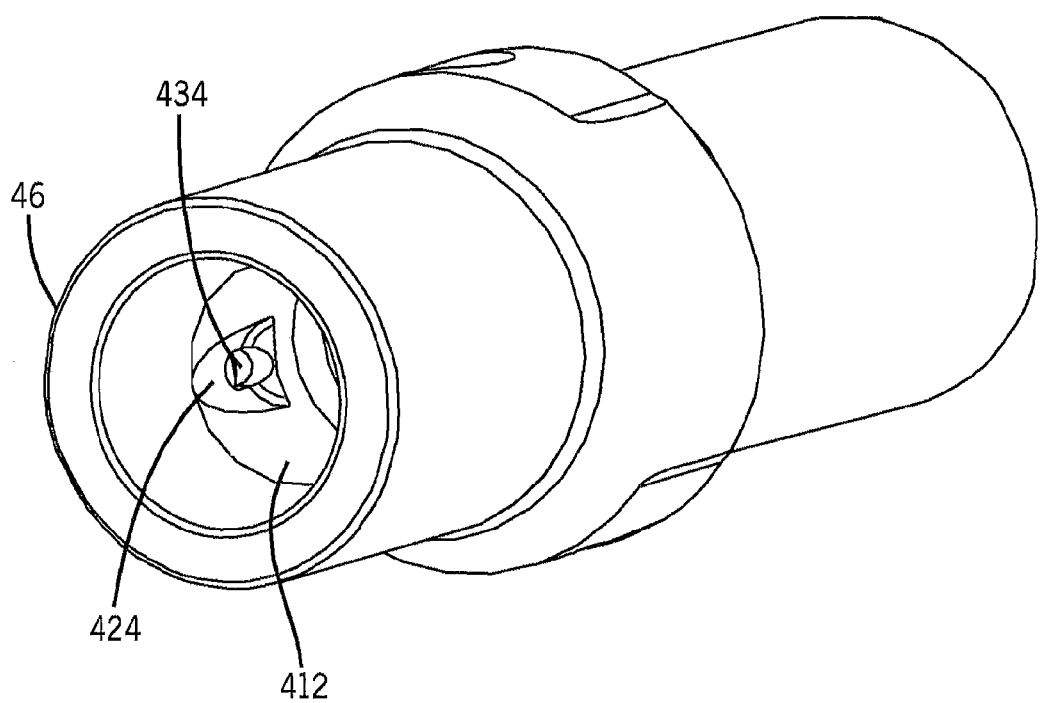
Figure 20:
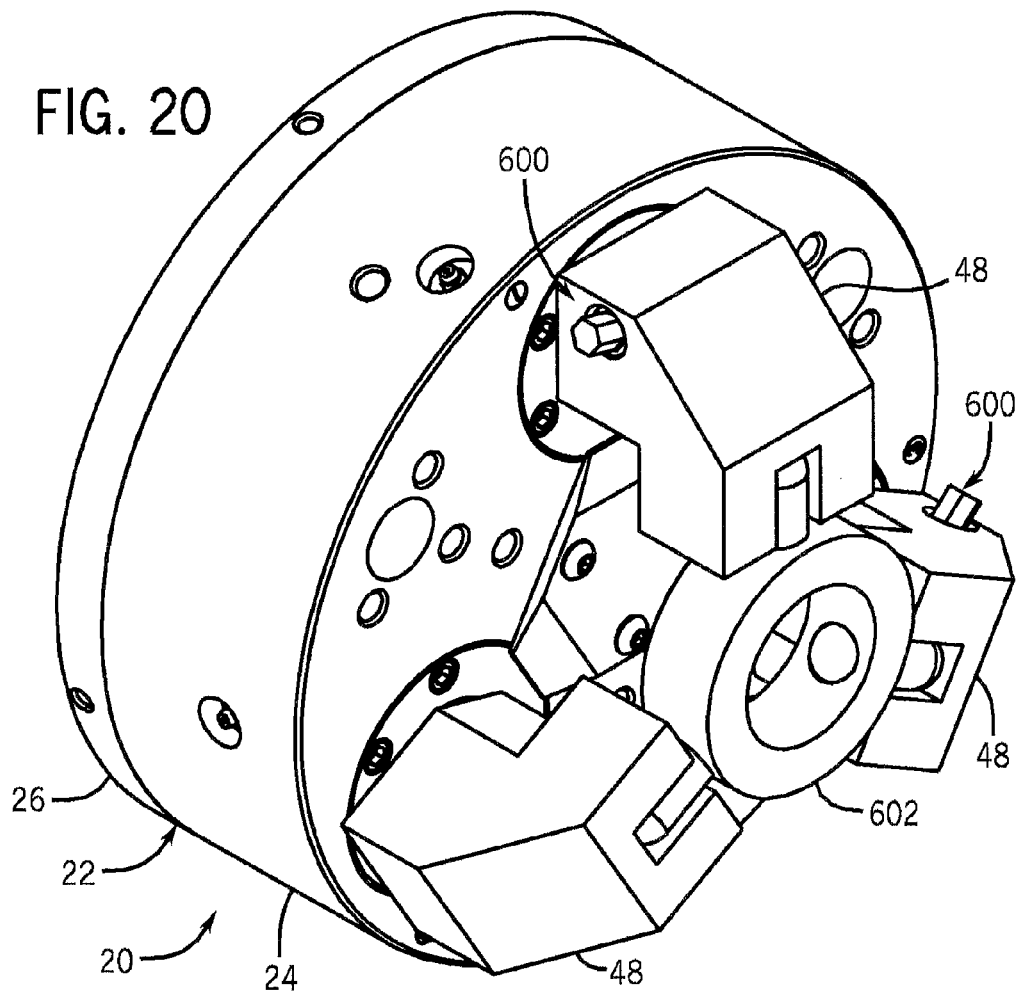
Figure 21:
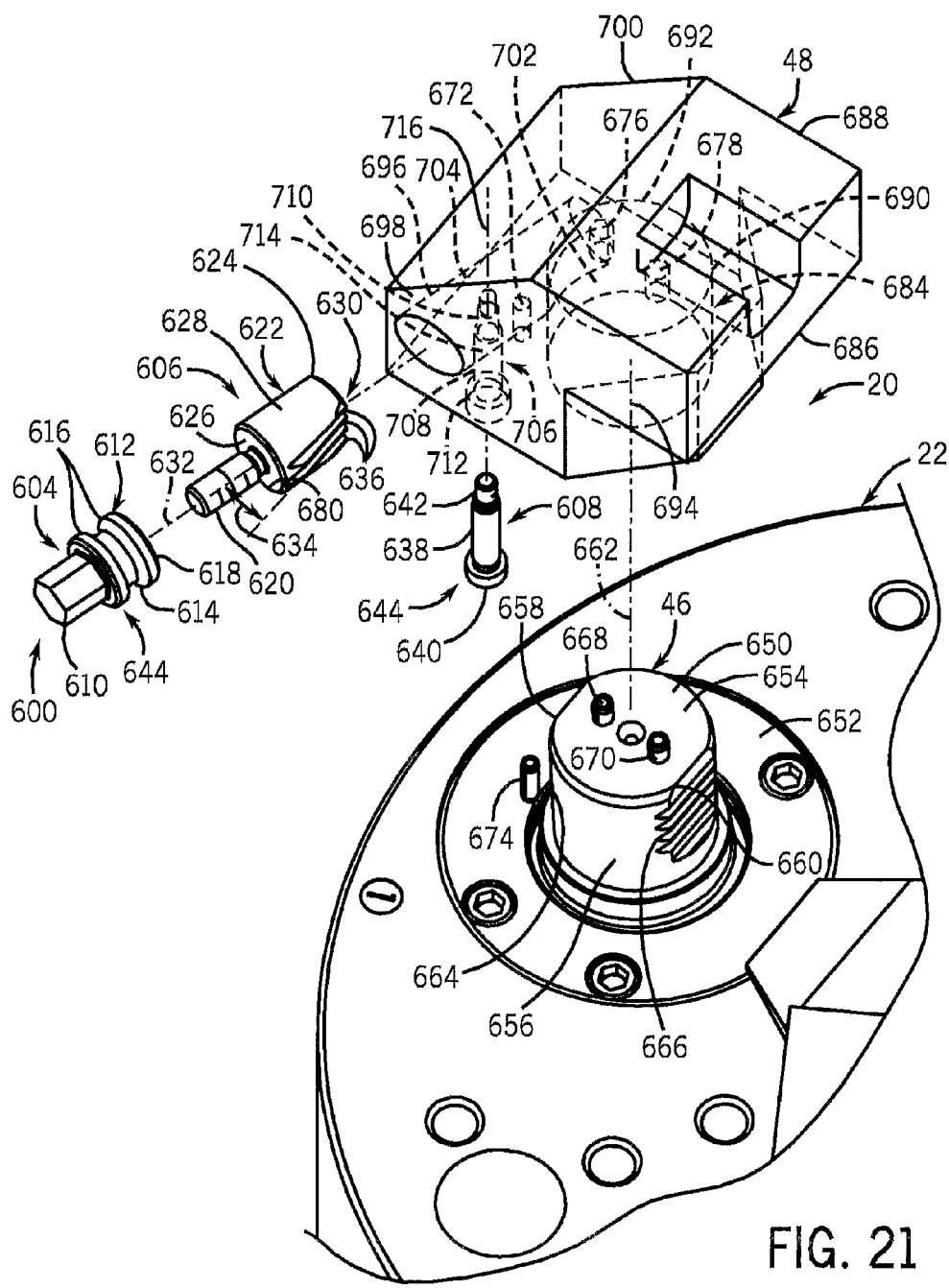
Figure 22:
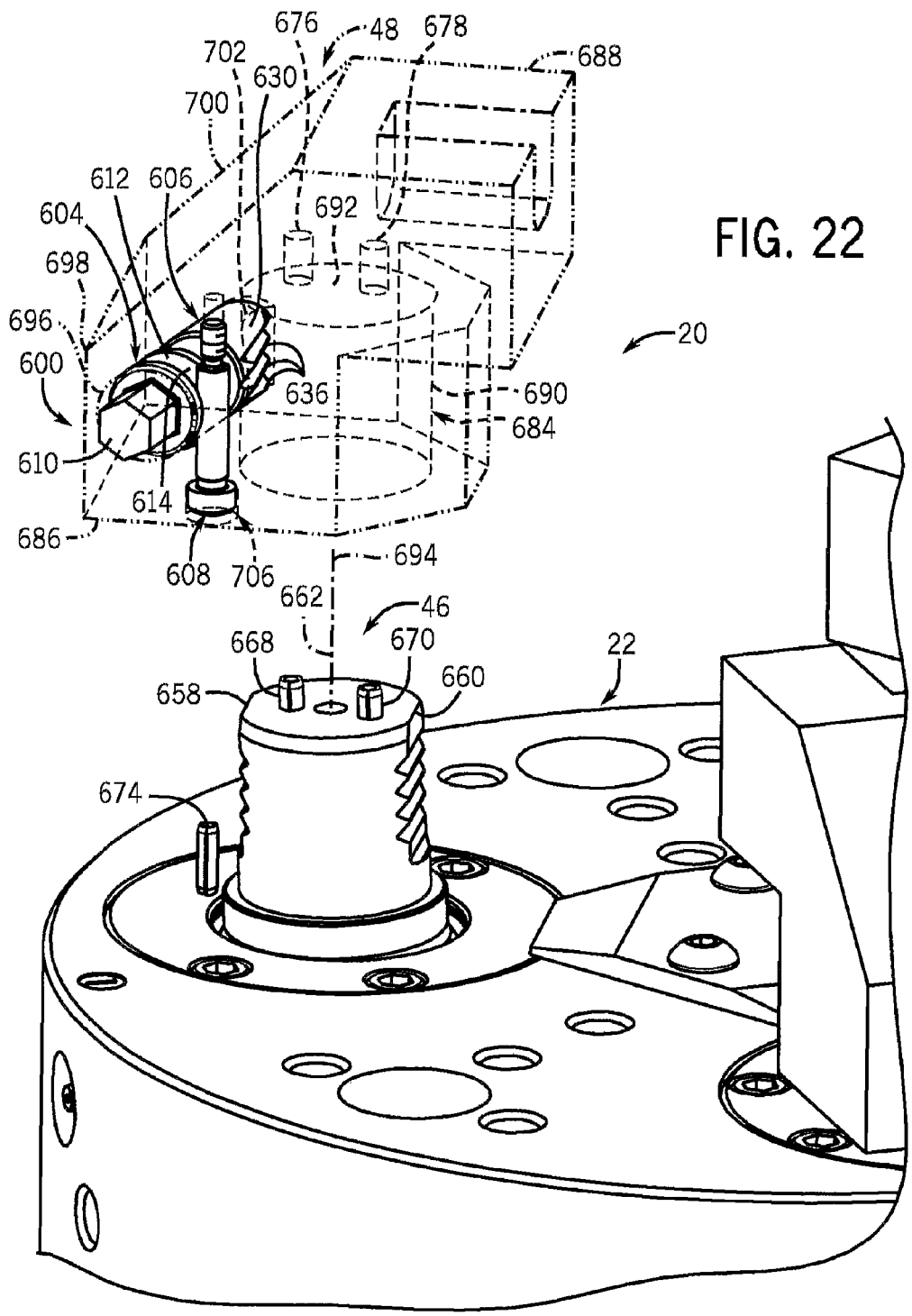
Figure 23:
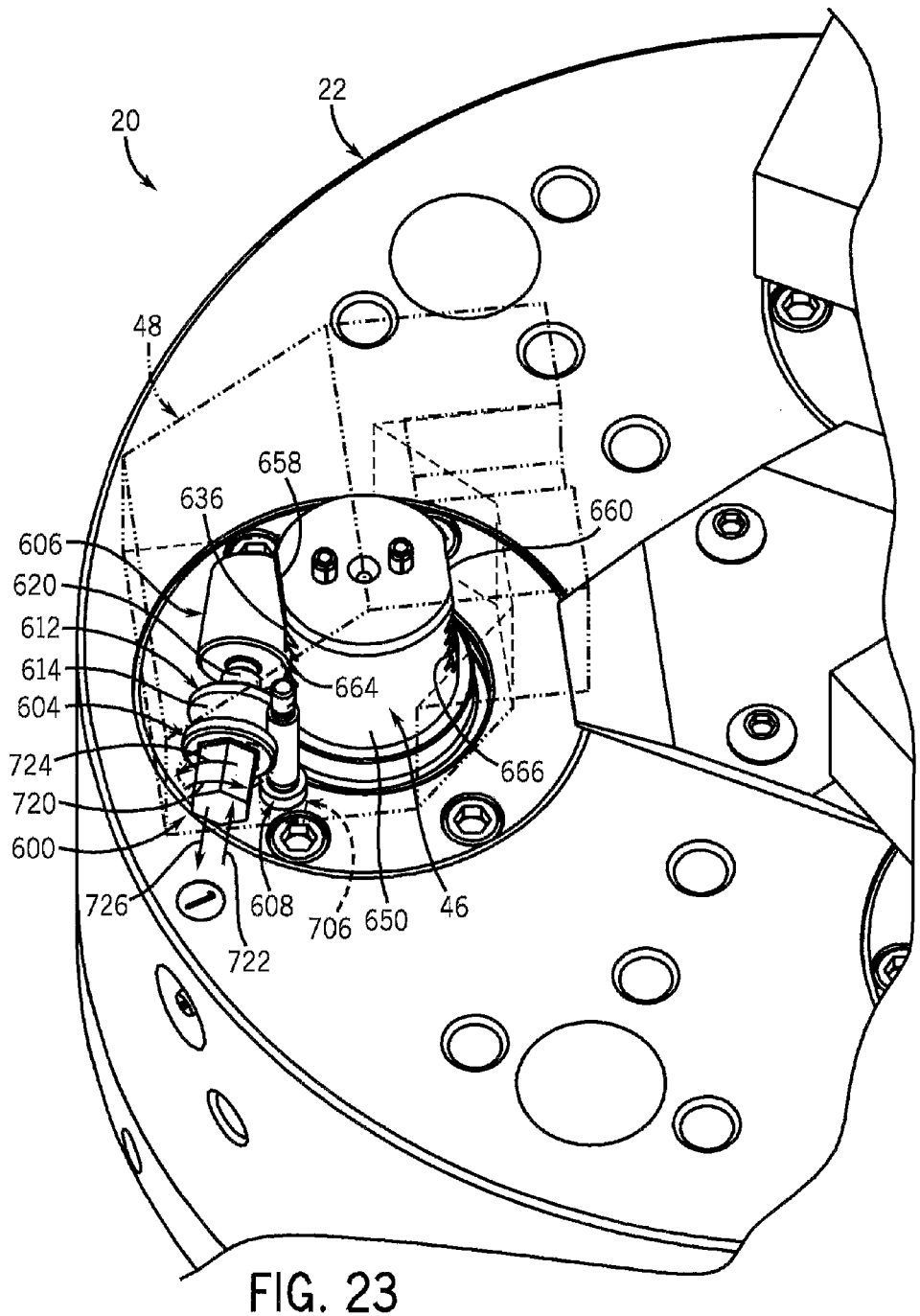
Figure 24:
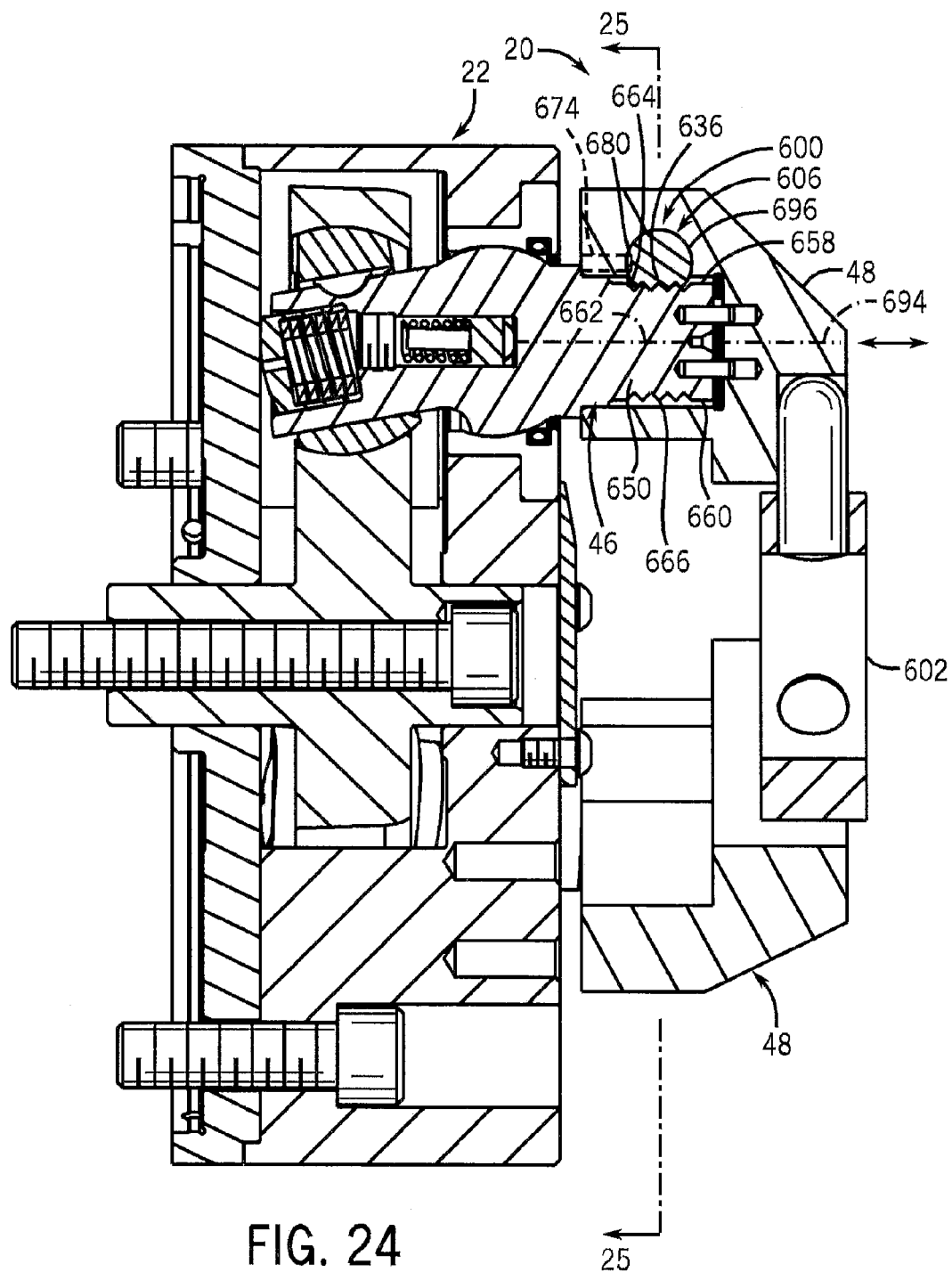
Figure 25:
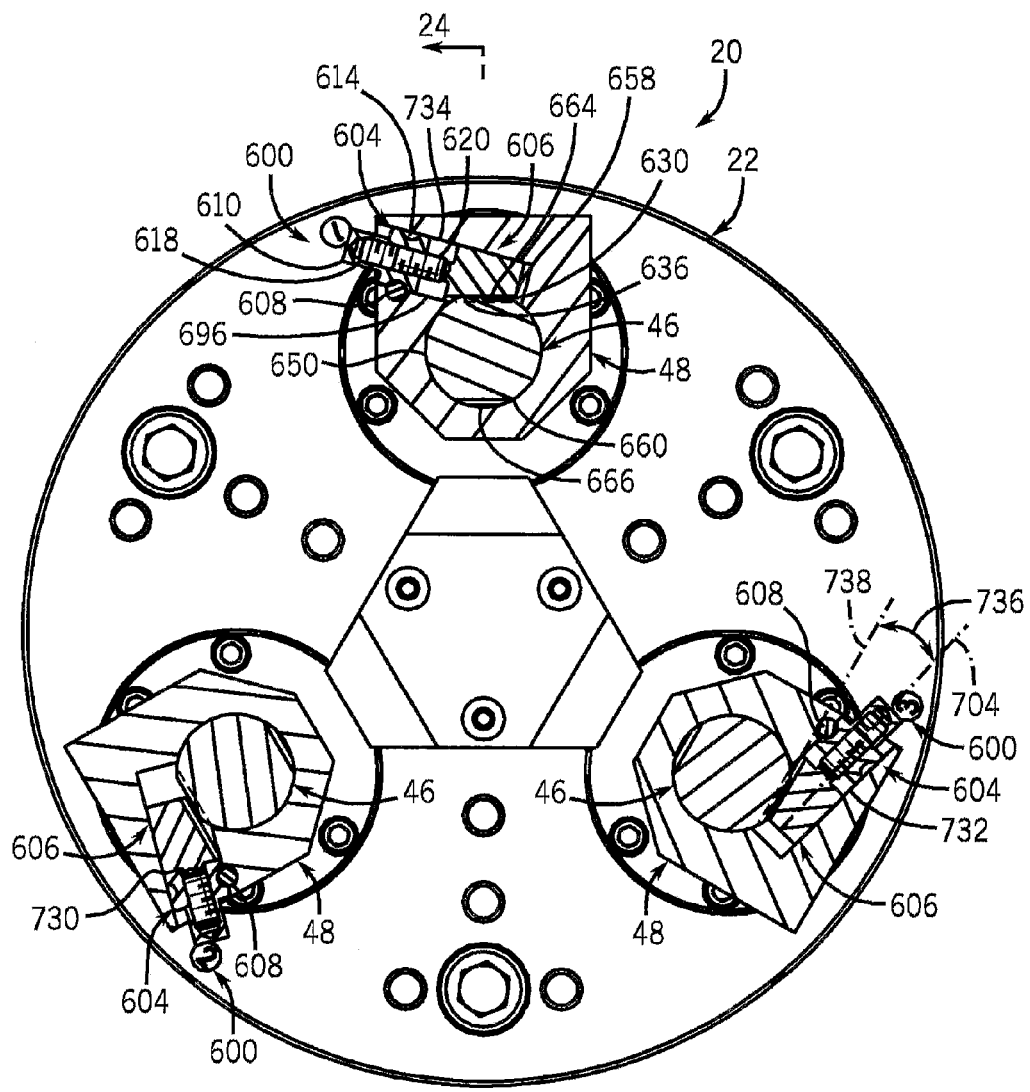
Figure 26:
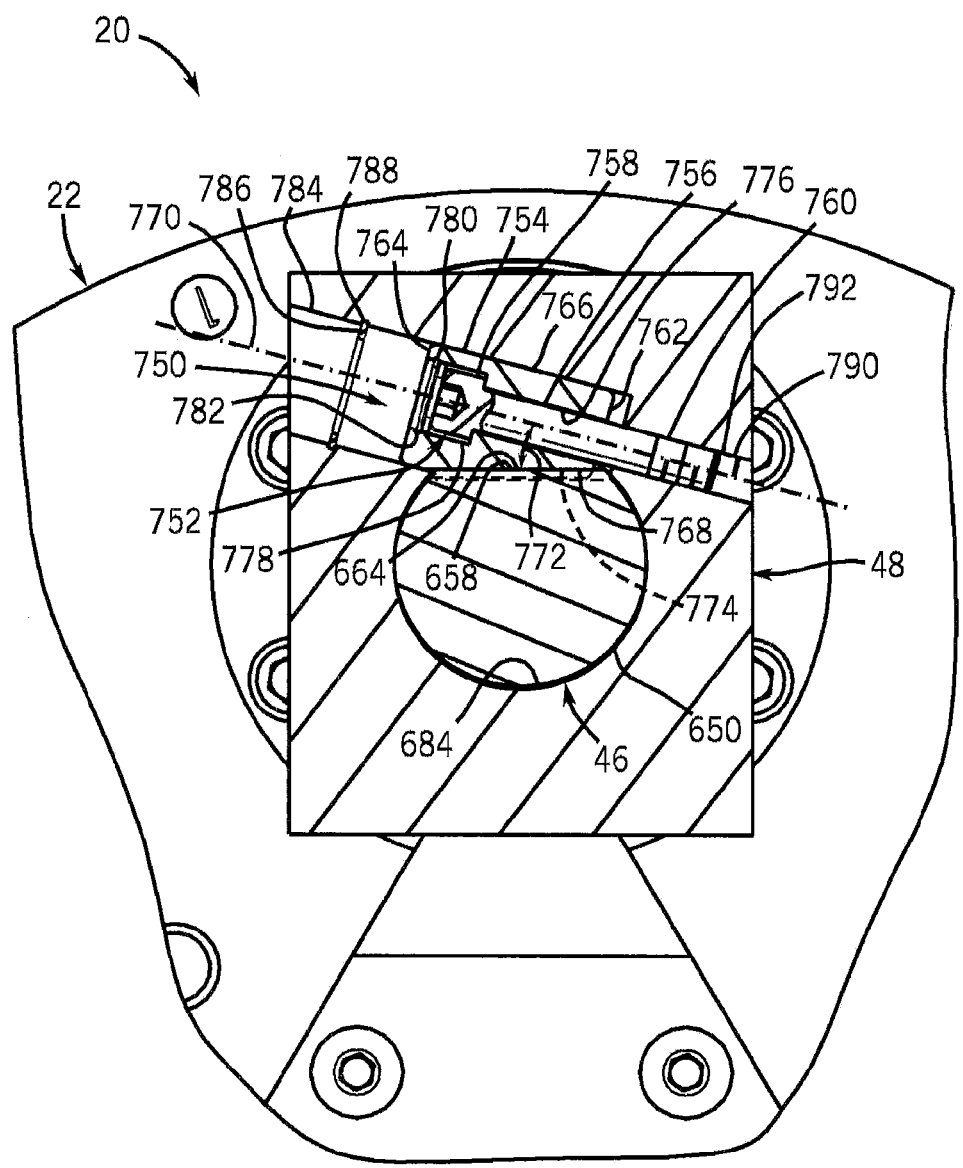
Figure 27:
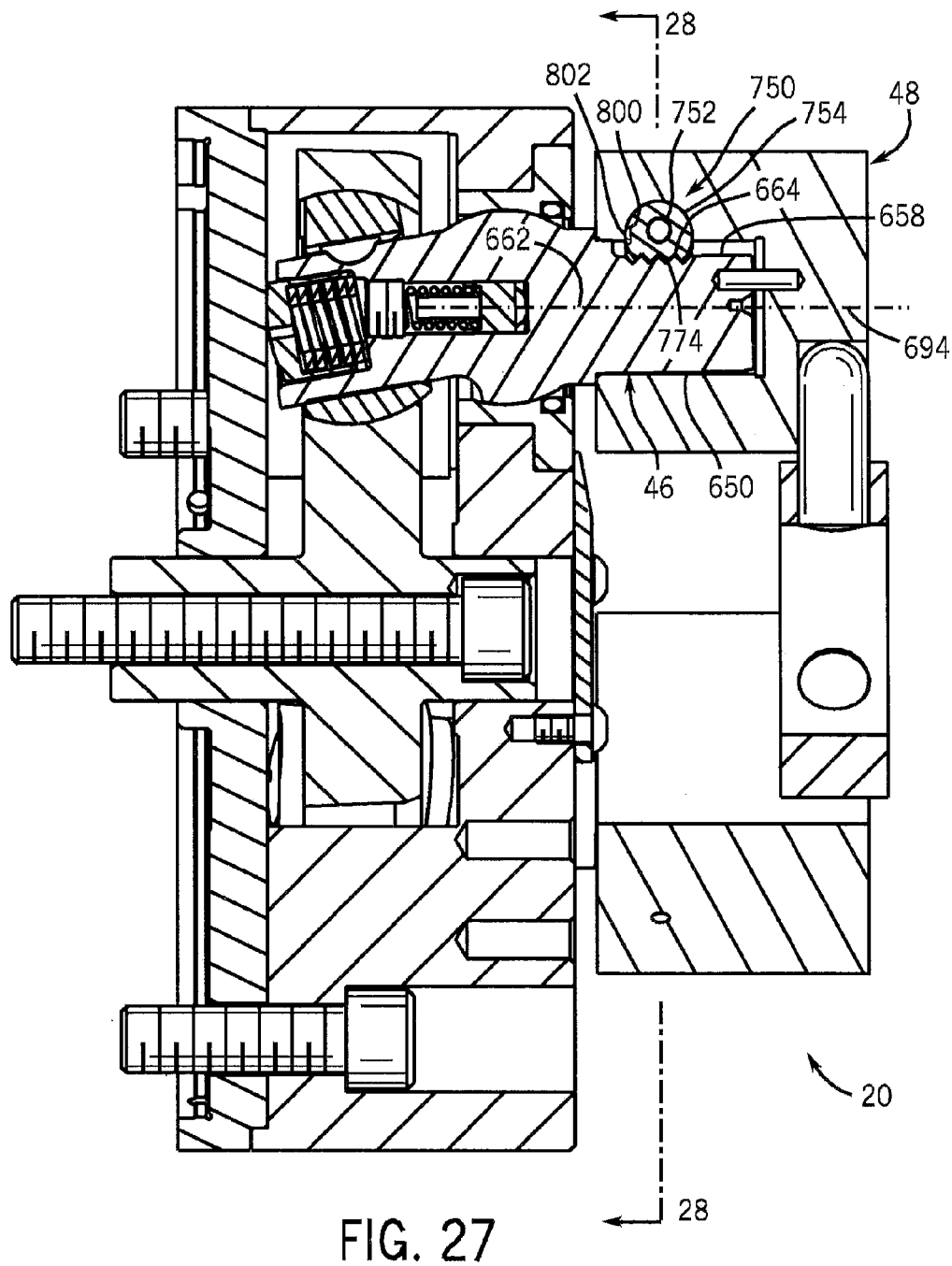

FIGS. 4A and B are cross-sectional views along line 4-4 of FIG. 2 showing an embodiment of the jaws in a retaining and releasing position, respectively;

FIG. 5 is an exploded assembly view of an embodiment of a first actuator arm assembly utilizing a single-piece bearing and a first quick-release mechanism;

FIG. 6 is a perspective view of an embodiment of the single-piece bearing of FIG. 5;

FIG. 7 is a bottom plan view of an embodiment of the single-piece bearing of FIG. 6;

FIGS. 8A and B are enlarged fragmented cross-sectional views of an embodiment of the first actuator arm assembly along line 8-8 of FIG. 2 with the quick-release mechanism in a released and engaged position, respectively;

FIG. 9 is a fragmented exploded view of an embodiment of a second actuator arm assembly utilizing a second quick-release mechanism;

FIGS. 10A and B are fragmented cross-sectional views of an embodiment of the assembled second actuator arm assembly along line 10-10 of FIG. 9 with the second quick-release mechanism in a released and engaged position, respectively;

FIG. 11 is a fragmented exploded view of an embodiment of a third actuator arm assembly utilizing a third quick-release mechanism;

FIGS. 12A and B are cross-sectional views of an embodiment of the assembled third actuator assembly along line 12-12 of FIG. 11 with the quick-release mechanism in a released and engaged position, respectively;

FIG. 13 is a fragmented cross-sectional view of an embodiment of a fourth actuator arm assembly showing the use of a single retaining bolt to secure a jaw thereto;

FIG. 14 is a perspective view of an embodiment of a fifth actuator arm assembly utilizing a fifth quick-release mechanism having a spring-loaded lock pin;

FIG. 15 is a cross-sectional view of an embodiment of the fifth quick-release mechanism of FIG. 14;

FIG. 16 is a cross-sectional view of an embodiment of the assembly of FIG. 14 with the spring-loaded lock pin in a locked position;

FIG. 17 is a cross-sectional view of an embodiment of the assembly of FIG. 14 with the spring-loaded lock pin in an unlocked position;

FIG. 18 is an exploded cross-sectional view of an embodiment of the assembly of FIG. 14 with the jaw removed from the actuator arm;

FIG. 19 is a perspective view of an embodiment of the actuator arm of FIG. 14;

FIG. 20 is a perspective view of an embodiment of a chuck having a sixth actuator arm assembly utilizing a sixth quick-release mechanism with a wedge-lock coupling;

FIG. 21 is a partial perspective view of an embodiment of the chuck of FIG. 20, illustrating the wedge-lock coupling exploded from a jaw, and illustrating the jaw exploded from an actuator arm;

FIG. 22 is a partial perspective view of an embodiment of the chuck of FIG. 20, illustrating the wedge-lock coupling installed in a jaw, and illustrating the jaw exploded from an actuator arm;

FIG. 23 is a partial perspective view of an embodiment of the chuck of FIG. 20, illustrating a jaw coupled to an actuator arm via the wedge-lock coupling;

FIG. 24 is a cross-sectional view of an embodiment of the chuck of FIG. 20, illustrating the wedge-lock coupling disposed between a jaw and an actuator arm;

FIG. 25 is a cross-sectional view of an embodiment of the chuck of FIG. 20, illustrating three sets of jaws, actuator arms, and wedge-lock couplings in different states;

FIG. 26 is a partial cross-sectional view of an embodiment of a chuck having a seventh actuator arm assembly utilizing a seventh quick-release mechanism with a wedge-lock coupling;

FIG. 27 is a cross-sectional view of an embodiment of the chuck of FIG. 26, illustrating the wedge-lock coupling disposed between a jaw and an actuator arm;

FIG. 28 is a cross-sectional view of an embodiment of the chuck of FIG. 26, illustrating three sets of jaws, actuator arms, and wedge-lock couplings in different states; and FIG. 29 is a partial cross-sectional view of an embodiment of a wedge-lock coupling, illustrating teeth having an offset to bias a jaw inwardly toward an actuator arm.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Certain disclosed embodiments of the single-piece bearing chuck may reduce jaw reconfiguration time by employing a quick-release mechanism. The quick-release mechanism may enable an operator to rapidly remove one set of jaws and attach a second set of jaws. In one embodiment, this quick-release mechanism includes a wedge-lock coupling, which gradually fits a wedge portion between a jaw and an actuator arm. For example, the wedge portion may include a tapered locking surface with teeth, which engage a flat surface with teeth on the actuator arm. The wedge fit and teeth provide a rigid connection, which can be quickly installed and released to swap jaws, reverse orientations of the jaw, and so forth. Other embodiments, presented below, may also facilitate rapid jaw reconfiguration.

Figure 1A:
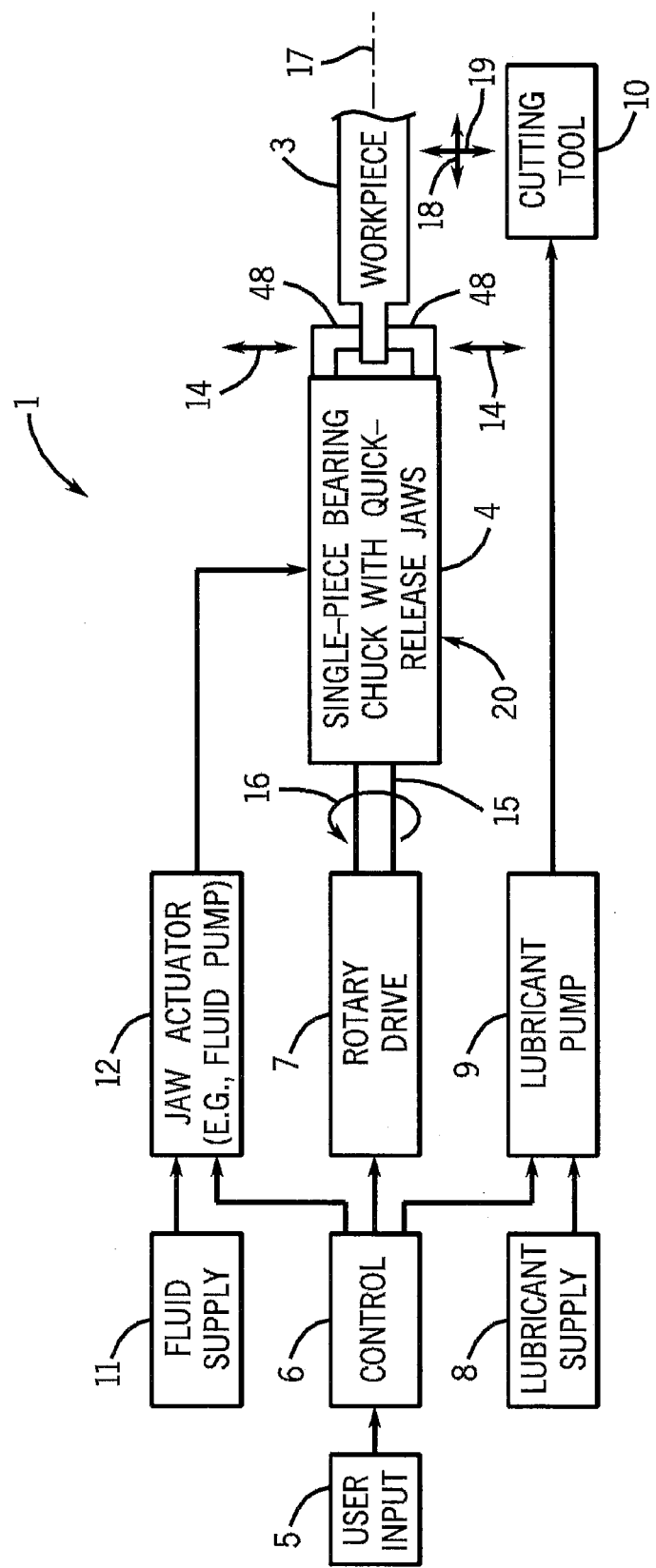
FIG. 1A is a block diagram of an embodiment of a system having a single-piece bearing chuck with quick-release jaws.
Figure 1B:
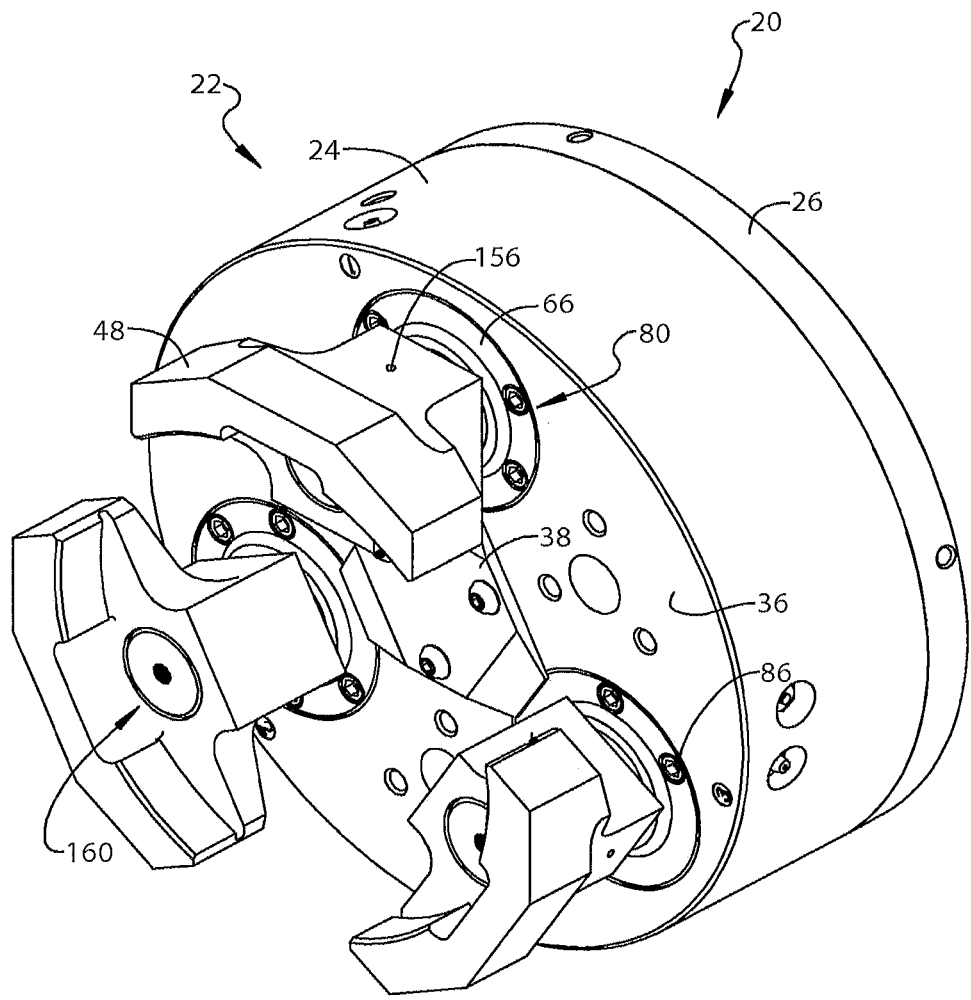
FIG. 1B is a perspective view of an embodiment of the chuck as shown in FIG. 1A.

FIG. 1A is a block diagram of an embodiment of a system 1 utilizing a chuck 20 with quick-release jaws and a single-piece bearing to secure a workpiece 3. As illustrated in FIG. 1A, the system 1 includes a user input 5, a control 6, a rotary drive 7 (e.g., an electric motor), a lubricant supply 8, a lubricant pump 9, a cutting tool 10, a fluid supply 11, and a jaw actuator 12 (e.g., a fluid pump). In certain embodiments, the chuck 20 includes a plurality of jaws 48 (e.g., quick-release jaws) configured to expand and contract as indicated by arrows 14, thereby opening and closing onto the workpiece 3. The rotary drive 7 couples to the chuck 20 via a shaft 15 or another suitable connection, to enable rotation as indicated by arrow 16. Thus, the rotary drive 7 provides torque to rotate the chuck 20, thereby rotating the workpiece 3 held by the plurality of jaws 48.

The illustrated control 6 is configured to control the rotary drive 7, the lubricant pump 9, the cutting tool 10, and the jaw actuator 12 via pre-set controls and/or the user input 5. For example, the control 6 may control the cutting tool 10 to move lengthwise along an axis 17 as indicted by arrow 18, radially inward and outward relative to the axis 17 as indicated by arrow 19, or a combination thereof. The cutting tool 10 may include a variety of blades, such as a lathe cutting tool. In addition, the control 6 may control the lubricant pump 9 to provide lubricant from the lubricant supply 8 to the cutting tool 10, the workpiece 3, or a combination thereof. The control 6 also may control the jaw actuator 12 to expand and contract the plurality of jaws 48 as indicated by arrows 14. In one embodiment, the jaw actuator 12 is a fluid pump, such as a hydraulic pump, which provides fluid from the fluid supply 11 to a fluid driven mechanism within the chuck 4 to actuate the opening and closing of the jaws 48. However, any suitable actuation mechanism may be used for opening and closing the jaws 48.

Referring to FIG. 1B-FIG. 4, a workholding chuck assembly 20 according to the disclosed embodiments is shown. The chuck 20 includes a housing subassembly 22 that includes a main body 24 and an end plate 26 attached in a sealing arrangement to a rear portion of the main body 24. A cavity 28 is formed between the main body 24 and the end plate 26. An actuator plate 30 is disposed in the cavity 28 and can move axially within the cavity 28 to allow the chuck 20 to retain and release workpieces as described below.

The actuator plate 30 includes a front hub 32 that resides within a central bore 34 in a front face 36 of the main body 24. A cover plate 38 is disposed over the central bore 34 in the front face 36 to block debris and other contamination from entering into the cavity 28 and the housing subassembly 22. The end plate 26 includes a central bore 40 that is configured to receive a rear hub 42 of the actuator plate 30. In this manner, the actuator plate 30 is supported for axial movement within the cavity 28 of the housing subassembly 22.

The end plate 26 and the main body 24 can include a plurality of openings 44, 45 that can be used to attach the housing subassembly 22 to an adaptor plate, which provides a proper bolt pattern for securing the chuck 20 to an appropriate lathe or other machining apparatus.

A plurality of actuator arms 46 is arranged within the housing subassembly 22 and can have a jaw 48 attached thereto. The actuator arms 46 can pivot about an axis within the housing subassembly 22 to cause the jaws 48 to move radially to retain and release a workpiece as described below. The actuator arms 46 are post-style arms that have a generally cylindrical front portion 50, a generally cylindrical rear portion 52, and a semi-spherical middle portion 54. The front and rear portions 50, 52 are axially offset from one another (not axially aligned), as shown in FIG. 4. The rear portion 52 is disposed within a rear bearing 56 having a generally semi-spherical exterior. The rear bearing 56 is disposed within an opening 58 in the actuator plate 30. The opening 58 has a concave inner periphery that is generally complementary to the generally semi-spherical exterior of the rear bearing 56. A key 60 blocks relative rotation between the rear portion 52 and the rear bearing 56. The middle portion 54 of the actuator arm 46 is disposed in a front bearing 66. The rear bearing 56 and the semi-spherical middle portion 54 of the actuator arm 46 are on a same front-rear center line. An end cap 70 and a spring 72 are disposed in a central bore 74 in the rear portion 52 of the actuator arm 46. The spring 72 biases the end cap 70 rearwardly and rides along the front surface of the end plate 26. The end cap 70 and the spring 72 thereby bias the actuator arm 46 forwardly and against the front bearing 66. The interior bore of the rear bearing 56 is offset and angled such that axial movement of the actuator plate 30 and the rear bearing 56 causes the actuator arm 46 to pivot within the front bearing 66 through an angle α relative to a front-rear center line of the front bearing 66, as shown in FIG. 4B. This pivoting motion of the actuator arms 46 moves the jaws 48 radially between a retaining position, as shown in FIG. 4A, and a releasing position, as shown in FIG. 4B, to grasp and release a workpiece, respectively.

Referring now to FIGS. 4-8, the actuator arm 46 is maintained within the chuck 20 by a front bearing assembly 80, which is secured to a stepped axial bore 82 in the front face 36 of the main body 24. The front bearing assembly 80 includes the front bearing 66, a seal ring assembly 84, and a plurality of retaining fasteners 86.

The front bearing 66 is a unitary non-split bearing that retains the actuator arm 46 within the housing subassembly 22. The front bearing 66 includes a generally circular front flange portion 94 and a generally cylindrical rear portion 96 extending rearwardly from the flange portion 94. The front bearing 66 is disposed within a stepped bore 82 in the front face 36 of the main body 24. The flange portion 94 includes a plurality of openings 100 that can receive fasteners 86 to secure the front bearing 66 to the housing subassembly 22. The front bearing 66 includes a central through opening 101 within which the actuator arm 46 is disposed. The central opening 101 includes an annular channel 102 in the flange portion 94 within which the seal ring assembly 84 is disposed. The seal ring assembly 84 includes a generally U-shaped annular member 104 with an annular spring 106 disposed therein. The annular spring 106 helps maintain contact between the annular member 104 and the exterior surface of the actuator arm 46 so as to retain grease within the front bearing 66.

The central opening 101 in the rear portion 96 of the front bearing 66 includes a front annular section 110 having a first radius and a rear annular section 112 rearward of the front annular section 110 having a second radius, The first and second radii can be the same. The first and second radii centers can be different. The rear portion 96 includes two axially extending pockets 116 that are spaced 180° apart. The pockets 116 are extended radially into front and rear sections 110, 112 to allow the semi-spherical middle portion 54 of the actuator arm 46 to be disposed therein, as described below.

Each pocket 116 includes a radial recess 118 that extends axially along the pocket 116. The recesses 118 work in conjunction with a horning mechanism 120 to allow limited rotational movement between the actuator aim 46 and the front bearing 66, as described below.

The rear portion 96 includes a removable wall portion 122 that forms part of one of the pockets 116 and includes the associated recess 118. The removable wall portion 122, as best seen in FIG. 7, includes convex sidewalls 124 that engage with complementary concave sidewalls 126 in the rear portion 96. Engagement between the convex sidewalls 124 and the concave sidewalls 126 radially secures the removable wall portion 122 within the rear portion 96. As a result of this engagement, the removable wall portion 122 is removed by axial movement relative to the rear portion 96. A set screw 128 (shown in FIG. 5) axially retains the removable wall portion 122 within the rear portion 96.

The semi-spherical middle portion 54 of the actuator arm 46 has a pair of opposing flats 132 that are spaced 180° apart with spherical surfaces 134 therebetween. The flats 132 allow the actuator arm 46 and the middle portion 54 to be inserted into the front bearing 66. Specifically, to insert the actuator arm 46 into the front bearing 66, the flats 132 are aligned 90° out of phase with the pockets 116 in the front bearing 66. With this alignment, spherical surfaces 134 are aligned with the pockets 116. This alignment allows the middle portion 54 to axially slide into the opening 101 and into the rear portion 96. Once the middle portion 54 is within the rear portion 96 and engaged with the seal ring assembly 84, the actuator arm 46 and/or the front bearing 66 can be rotated 90° relative to one another so that the flats 132 are now aligned with the pockets 116. With this alignment, the spherical surfaces 134 engage with the front and rear sections 110, 112 of the rear portion 96 between the pockets 116. Engagement of the spherical surface 134 with the front and rear sections 110, 112 enable the actuator arm 46 to pivot within the front bearing 66 to allow radial movement of the jaws 48 to grip and release a workpiece, as described below.

The middle portion 54 includes a radially extending through an opening 136 that receives the homing mechanism 120. The homing mechanism 120 allows limited relative rotation between the actuator arm 46 and the front bearing 66. The horning mechanism 120 includes a pair of engaging members 140 having tapered tips 142, a spring 144, and a rod 146. As best seen in FIG. 8, the engaging members 140, the spring 144, and the rod 146 are disposed in the opening 136 in the middle portion 54 of the actuator arm 46. The spring 144 biases the engaging members 140 radially outwardly so that the tips 142 engage with the recesses 118 in the rear portion 96 of the front bearing 66. The rod 146 limits relative radial movement of the engaging members 140 toward one another. The engagement of the tips 142 with the recesses 118 allows limited relative rotation between the actuator arm 46 and the front bearing 66 while biasing the actuator arm 46 toward an aligned home position within the front bearing 66. This limited relative rotation facilitates the engagement of the jaw 48 with a workpiece. Specifically, when clamping a workpiece in the chuck 20, the engagement of the jaws 48 with the workpiece may involve some slight twisting of the jaws 48 relative to the workpiece to get a firm grip. This limited relative rotation is facilitated by the horning mechanism 120 associated with each actuator arm 46.

The removable wall portion 122 enables the horning mechanism 120 to be assembled in the opening 136. Specifically, when the actuator arm 46 is disposed in the front bearing 66, as described above, a first one of the engaging members 140 is inserted through the opening 136. The spring 144 and the rod 146 are then inserted into the opening 136. The other engaging member 140 can then be inserted into the opening 136 and forcibly pushed toward the other engaging member 140 and held in place against the force of the spring 144. The removable wall portion 122 can then be axially inserted into the rear portion 96 and the engagement of concave and convex sidewalls 126, 124 blocks the home mechanism 120 from coming out of the opening 136. The set screw 128 is then used to axially secure the removable wall portion 122 to the rear portion 96.

The jaws 48 are attached to the front portions 50 of the actuator arms 46. As shown in FIG. 5, the front portion 50 of the actuator arm 46 can include a pair of axially extending tangs 150. The tangs 150 can be offset (eccentric) relative to an axially extending center line of the front portion 50. The tangs 150 can engage with complementary offset recesses 152 in an interior stepped through a bore 154 of the jaw 48. The jaw 48 includes a vent opening 156 to facilitate the positioning/removing the jaw 48 on/from the actuator arm 46. Engagement of the tangs 150 with complementary offset the recesses 152 in the jaw 48 blocks relative rotational movement between the jaw 48 and the actuator arm 46.

According to the disclosed embodiments, the jaws 48 can be removably secured to the front portions 50 of the actuator arms 46 with a quick-release mechanism. A first quick-release mechanism 160, as best seen in FIGS. 5 and 8, uses a central bore 162 in the front portion 50 of the actuator arm 46 to secure the jaw 48 thereto. The central bore 162 includes a radially extending annular channel 164 to facilitate the retaining of the jaw 48 to the actuator arm 46. The quick-release mechanism 160 also includes an axially extending retaining member 166 having a head 168 and a stem 170. A central bore 172 extends axially through the retaining member 166. The central bore 172 includes a first portion 174 adjacent the head 168 that has a first diameter and a second portion 176 adjacent the end of a stern 170 having a second diameter larger than the first diameter. The first portion 174 is threaded. A threaded fastener 178 is disposed in the central bore 172 and engages with the threads in the first portion 174. The quick-release mechanism 160 also includes a first set of retaining balls 180 having a first diameter and a single actuating ball 182 larger than the retaining balls 180. Three radially extending openings 184 extend through the stern 170 adjacent its end. The openings 184 can be equally spaced about the periphery of the stem 170.

Figure 8B:
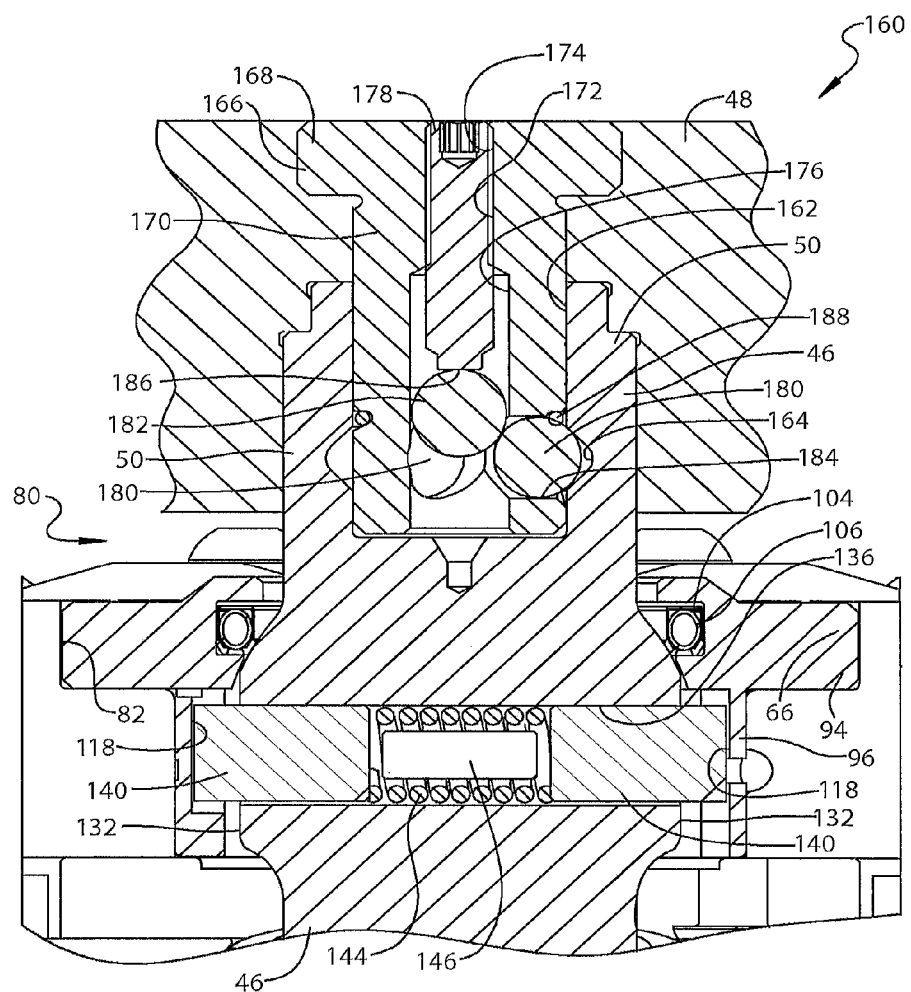

The actuating ball 182 and the retaining balls 180 are disposed in the second portion 176 of the central bore 172 with the retaining balls 180 aligned with the openings 184. The actuating ball 182 is disposed between the retaining balls 180 and an end 186 of the fastener 178. Retaining rings 188 (FIG. 8 only) can be disposed in the openings 184 to inhibit the retaining balls 180 from being pushed entirely through the openings 184. Non-removing axial movement of the fastener 178 relative to the retaining member 166 allows the quick-release mechanism 160 to secure the jaw 48 to the actuator arm 46, as shown in FIG. 8B, and allows the jaw 48 to be removed from the actuator arm 46, as shown in FIG. 8A. Specifically, as shown in FIG. 8B, when the fastener 178 is rotated in the appropriate direction a few rotations relative to the retaining member 166, the end 186 pushes the actuating ball 182 rearwardly into the retaining balls 180. This movement causes the retaining balls 180 to move radially outwardly into the openings 184 and protrude beyond the outer periphery of the stem 170 and into the annular channel 164. In this position, the retaining member 166 is secured to the actuator arm 46 and thereby retains the jaw 48 on the actuator arm 46.

When it is desired to remove the jaw 48 from the actuator arm 46, the fastener 178 is rotated the opposite direction relative to the retaining member 166. With a few rotations of the fastener 178, the end 186 no longer presses the actuating ball 182 against the retaining balls 180. The jaw 48 can then be pulled away from the actuator arm 46. The sloping nature of the annular channel 164 causes a radially inward force to be exerted on the retaining balls 180, thereby pushing the retaining balls 180 into the stem 170. The movement of the retaining balls 180 back into the stem 170 allows the jaw 48 to be removed from the front portion 50 of the actuator arm 46.

Thus, the quick-release mechanism 160 enables the jaws 48 to be quickly and easily attached to and removed from the actuator arms 46. The fastener 178 is not removed from the retaining member 166 during the operation of the quick-release mechanism 160. Rather, a few simple turns of the fastener 178 allows sufficient clearance between the end 186 and the actuating ball 182 to allow the retaining member 166 to disengage from the actuator arm 46. Conversely, a few simple turns of the fastener 178 in an opposite direction cause enough movement in the actuating ball 182 to push the retaining balls 180 into the annular channel 164 and secure the retaining member 166 to the actuator arm 46. The quick-release mechanism 160 thereby provides an easy and efficient way to change the jaws 48 so that the chuck 20 can be configured to receive different workpieces.

Referring now to FIGS. 9 and 10, a second quick-release mechanism 200 that can be used to secure the jaw 201 to an actuator arm 202 is shown. The middle and rear portions of the actuator arm 202 are substantially the same as that discussed above with reference to the actuator arm 46. As such, the middle and rear portions are not shown nor discussed. A front portion 204 of the actuator arm 202, however, is different. The front portion 204 includes a central bore 206 that extends axially into the actuator arm 202. A first portion 208 of the central bore 206 adjacent the end is a radially elongated slot. A second portion 210 of the central bore 206 rearward of the first portion 208 is generally cylindrical. A third portion 212 is rearward of the second portion 210 and is also cylindrical but has a diameter that is smaller than the second portion 210. A radially extending an annular channel 214 is disposed in the second portion 210 of the central bore 206. Three stepped through openings 216 extend through the annular channel 214 to the outer periphery of the front portion 204. The openings 216 can be equally spaced about the periphery of the front portion 204. Another through opening 218 extends through the front portion 204 and into the second portion 210 of the central bore 206 rearwardly of the openings 216.

The quick-release mechanism 200 includes a spring 220 that is disposed in the third portion 212 of the central bore 206. A retaining member 222 is disposed in each opening 216 of the central bore 206. The retaining members 222 each include a rounded inner head 224 and a stem 226 extending therefrom having a rounded end 228. The stepped openings 216 engage with the shoulder of the inner head 224 to block the retaining members 222 from passing entirely through the openings 216. A camming member 230 is disposed in the opening 218. The camming member 230 includes a head 232 and a pin 234 extending therefrom. The pin 234 is eccentrically attached to the head 232 (i.e., the pin 234 is offset from the rotational axis of the head 232). The head 232 includes a tool recess 236 that is configured to receive a tool therein to rotate the camming member 230 within the opening 218. A snap ring 238 retains the camming member 230 in the opening 218 and allows the camming member 230 to non-removably rotate within the opening 218.

An actuating member 240 includes a head 242 and a stem 244 extending therefrom. The head 242 is complementary to a slotted first portion 208 of the central bore 206. The stem 244 includes an end portion 246 that is generally cylindrical with a diameter slightly smaller than the diameter of the second portion 210 of the central bore 206. A neck portion 248 of the stem 244 is disposed between the end portion 246 and the head 242. The neck portion 248 has a diameter that changes between the end portion 246 and the head 242 with a smallest diameter at a general midpoint location of the neck portion 248. The end portion 246 includes a slot 250 on a periphery thereof. The slot 250 receives the eccentric pin 234 of the camming member 230. Rotation of the camming member 230 pushes on the slot 250, which, in turn, moves the actuating member 240 axially within the central bore 206.

The jaw 201 has an axially extending stepped bore 254 that is configured to receive the front portion 204 of the actuator arm 202. A first portion 256 of the bore 254 is circular and is complementary to the exterior of the front portion 204 of the actuator arm 202. A second portion 258 of the bore 254 is slotted and is complementary to the slotted head 242 of the actuating member 240. The first portion 256 of the bore 254 includes a radially extending annular channel 260 that is configured to receive the ends 228 of the retaining members 222.

The quick-release mechanism 200 allows the jaw 201 to be easily and quickly secured to and removed from the actuator arm 202. Non-removing rotation of the camming member 230 moves the actuating member 240 axially between a release position, as shown in FIG. 10A, and a retaining position, as shown in FIG. 10B, The spring 220 biases the actuating member 240 toward the retaining position. When the quick-release mechanism 200 is in the engaged position, as shown in FIG. 10B, the jaw 201 is secured to the actuator arm 202 through the interaction of the retaining members 222 and the annular channel 260. Specifically, the spring 220 biases the actuating member 240 forwardly toward the jaw 201. As a result, the inner heads 224 of the retaining members 222 engage the end portion 246 of the actuating member 240. This engagement pushes the retaining members 222 radially outwardly such that the ends 228 engage with the annular channel 260. This engagement blocks the jaw 201 from being moved axially relative to the actuator arm 202. Additionally, with the actuating member 240 in the engaged position, the head 242 is disposed in the slotted second portion 258 of the stepped bore 254 and the jaw 201. The engagement of the head 242 with the slotted second portion 258 blocks relative rotation between the jaw 201 and the actuator arm 202. Thus, when in the engaged position, the jaw 201 is secured to the actuator arm 202 and the actuator arm 202 can be pivoted to allow the jaws 201 to retain and release a workpiece.

When it is desired to remove the jaw 201, the camming member 230 is non-removably rotated within the opening 218 with an appropriate tool. Rotation of the camming member 230 causes the pin 234 to push the actuating member 240 rearwardly within the actuator arm 202 against the biasing force of the spring 220. The rearward movement of the actuating member 240 results in the inner heads 224 of the retaining members 222 being aligned with the neck portion 248 of the actuating member 240, as shown in FIG. 10B. The jaw 201 can then be moved axially relative to the actuator arm 202. If the ends 228 of the retaining members 222 are protruding into the annular channel 260, the tapering nature of the annular channel 260 and the rounded nature of the ends 228 cause a radially inward force on the retaining members 222 such that the retaining members 222 move radially inwardly and into engagement with the neck portion 248 and allow the jaw 201 to be removed from the actuating arm 202. Once the jaw 201 has been removed from the actuator arm 202, the user can release the camming member 230, which can result in the actuating member 240 staying in place or moving forwardly under the influence of the spring 220.

To attach the jaw 201 to the actuating arm 202, the camming member 230 is rotated, if needed, to move the actuating member 240 rearwardly into the actuating arm 202, which allows the retaining members 222 to be moved radially inwardly. The rounded nature of the ends 228 can allow the jaw 201 to push the retaining members 222 radially inwardly when positioning the jaw 201 on the front portion 204 of the actuator arm 202. Once the jaw 201 is securely positioned on the actuator arm 202, the camming member 230 can be rotated to move the quick-release mechanism 200 to the engaged position, as shown in FIG. 10A. In some instances, the movement of the quick-release mechanism 200 from the disengaged to the engaged position may be done entirely as a result of the influence of the spring 220 once the camming member 230 is released from being held in the disengaged position.

Thus, the second quick-release mechanism 200 according to the disclosed embodiments can easily and quickly allow the jaws 201 to be attached to and removed from the actuator arms 202. It should be appreciated that the jaw 201 is shown as being a blank that can be machined to provide a desired gripping surface or features for retaining a workpiece therein.

Referring now to FIGS. 11 and 12, a third quick-release mechanism 300 that allows quick and easy attachment/removal of a jaw 301 to/from an actuator arm 302 according to the disclosed embodiments is shown. In the third quick-release mechanism 300, the middle and rear portions of the actuator arm 302 are substantially the same as the middle and rear portions of the actuator arm 46 discussed above. As such, the middle and rear portions are not shown nor discussed. A front portion 304 of the actuator arm 302, however, is different. The front portion 304 is generally cylindrical and includes a radially inwardly extending recess 306 therein. A plurality of through openings 308 extends through the recess 306 into a central bore 310 of the front portion 304. A ring member 312 is configured to fit around the front portion 304 within the recess 306. The ring member 312 includes a plurality of tapered openings 314 that align with the openings 308 in the recess 306. A plurality of retaining balls 316 is disposed in the central bore 310 and can extend radially outwardly through the openings 308, 314. Radial movement of the retaining balls 316 relative to the openings 308, 314 allows the jaw 301 to be secured to and removed from the actuator arm 302, as described below.

An actuating member 320 includes a camming portion 322 having a plurality of generally cylindrical surfaces 324 with a plurality of ramps 326 disposed therebetween. The ramps 326 have a radial dimension that changes between adjacent cylindrical surfaces 324, as best seen in FIG. 12. A stem 328 extends forwardly from the camming portion 322 and includes a head 330 that can be engaged with a tool to non-removably rotate the actuating member 320 within the actuator arm 302 as described below.

An end plate 332 is configured to attach to the end of the front portion 304 to secure the actuating member 320 and the retaining balls 316 within the central bore 310 and to retain the ring member 312 on the front portion 304 of the actuator arm 302. The end plate 332 can be secured to the actuator arm 302 with a plurality of fasteners 334. The end plate 332 includes a central bore 336 through which the head 330 and the stem 328 of the actuating member 320 extend. A pair of tangs 338 extends from the end plate 332 and is offset from the central axis of the central bore 336. The tangs 338 engage with complementary offset recesses at the end of a central bore 340 of the jaw 301 to block relative rotation between the actuator arm 302 and the jaw 301.

The central bore 340 of the jaw 301 includes a radially extending annular channel 342. The annular channel 342 aligns with the openings 308, 314 when the jaw 301 is positioned on the actuator arm 302. Non-removing rotation of the actuating member 320 relative to the jaw 301 and the actuator arm 302 causes radial movement of the retaining balls 316 relative to the actuator arm 302 and the jaw 301 to allow the jaw 301 to be secured to and released from the actuator arm 302.

As shown in FIG. 12A, when the retaining balls 316 are engaged with the ramps 326 of the actuating member 320, the retaining balls 316 do not extend into the annular channel 342. In this position, the jaw 301 can be removed from or positioned on the actuator arm 302. To retain the jaw 301 to the actuator arm 302, the actuating member 320 is rotated relative to the actuator arm 302 and the jaw 301. This relative rotation causes the ramps 326 to push the retaining balls 316 radially outwardly through the openings 308, 314 and into the annular channel 342. With sufficient rotation, the cylindrical surfaces 324 engage with the retaining balls 316 to provide the maximum radially outward position for the retaining balls 316. In this position, the jaw 301 is axially secured to the actuator arm 302 by the retaining balls 316. The tangs 338 block relative rotation between the jaw 301 and the actuator arm 302.

To release the jaw 301, the actuating member 320 is rotated in the opposite direction so that the retaining balls 316 engage with the ramps 326 and can move radially inwardly. The annular channel 342 can have sloped surfaces such that axial movement of the jaw 301 relative to the actuator arm 302 can exert a radially inward force on the retaining balls 316 to facilitate movement of the retaining balls 316 radially inwardly when releasing the jaw 301.

Thus, the third quick-release mechanism 300 according to the disclosed embodiments can easily and quickly allow the jaws 301 to be secured to and removed from the actuator arms 302. Again, it should be appreciated that the jaw 301 is shown as a blank and can be machined to provide the desired gripping features for the jaw 301.

Referring now to FIG. 13, a cross-sectional view of another way to retain a jaw 400 to a front portion 402 of an actuator aim 403 is shown. Specifically, the front portion 402 includes a threaded central bore 404. A single-threaded fastener 406 can be secured in the central bore 404 to retain the jaw 400 on the front portion 402. The front portion 402 can include a pair of tangs 408 that are eccentric relative to an axial center of the central bore 404. The tangs 408 can engage with complementary recesses at an end of a bore 409 in the jaw 400 to block relative rotation between the jaw 400 and the actuator arm 403. Thus, if desired, the single-threaded fastener 406 can be used to retain the jaw 400 to the actuator arm 403. It should be appreciated, however, that the use of the single-threaded fastener 406 does not provide the quick-release capability described above with reference to the quick-release mechanisms 160, 200, and 300. Further, the single-threaded fastener 406 is removed to change the jaw 400.

FIG. 14 is a perspective view of a fifth embodiment of the chuck 20 having quick-release jaws 48. In this embodiment, jaws 48 may be secured to actuator arms 46 by spring-loaded lock pins 410. As discussed in detail below, the spring-loaded lock pins 410 may extend axially, radially, or a combination thereof, through the actuator arms 46 and/or jaws 48 to secure these components together. The spring force biases the pins 410 in a first direction into a locked position, whereas an opposite force in an opposite second direction compresses each spring to move the pins 410 to an unlocked position. Thus, the spring-loaded pins 410 enable a quick-locking mechanism and a quick-release mechanism for the jaws 48 with the actuator arms 46. In certain embodiments, as discussed below, the spring-loaded lock pins 410 may extend angularly through the actuator arms 46 and jaws 48 between the locked and unlocked positions.

As can be seen in FIG. 14, jaws 48 may be inserted into cavities 412 within the actuator arms 46. In other words, the actuator arms 46 and the jaws 48 are in a coaxial arrangement, wherein the actuator arms 46 have a generally annular wall 413 disposed about the jaws 48 within the cavities 412. Thus, the outer diameter of the jaws 48 is less than the outer diameter of the actuator arms 46. This coaxial configuration with the jaws 48 inside the actuator arms 46 may produce a lighter chuck 20 than those described in the above embodiments. As will be discussed in detail below, each jaw 48 may be separated from the actuator arm 46 by inserting a jaw release tool 414 into the actuator arm 46 and compressing the spring-loaded lock pin 410 away from a locked position to an unlocked position, While FIG. 14 illustrates this removal process for only one jaw 48, the same technique may be applied to the other jaws 48.

FIG. 15 is a cross section of the fifth embodiment of the chuck 20 as shown in FIG. 14, illustrating the jaw release tool 414 compressing the spring-loaded lock pin 410. The jaw 48 has a workpiece holding portion 416 and a shaft portion 418.

As illustrated, the shaft portion 418 fits within the cavity 412 of the actuator arm 46. Once in the cavity 412, the jaw 48 may be held in place by the spring-loaded lock pin 410 located within the shaft portion 418. In the illustrated embodiment, the spring-loaded lock pin 410 extends through the shaft portion 418 of the jaw 48 between a locked position and an unlocked position relative to the annular wall 413 of the actuator arm 46. In particular, the spring-loaded lock pin 410 has a linear path of travel along an axis 415 at an angle 417 relative to a central longitudinal axis 419 of the actuator arm 46 and the jaw 48. In certain embodiments, the angle 417 may be greater than 0 degrees and less than 90 degrees. For example, the angle 417 may range between about 0 to 90 degrees, 0 to 60 degrees, 0 to 45 degrees, 0 to 30 degrees; or 0 to 15 degrees. By further example, the angle 417 may be about 5, 10, 15, 20, 25, 30, 35, 40, or 45 degrees, or any angle therebetween. As discussed further below, the spring-loaded lock pin 410 may interconnect the jaw 48 with the actuator arm 46 to block axial movement of the jaw 48 along the axis 419, rotational movement of the jaw 48 about the axis 419, or a combination thereof. The tool 414 may be used to create a counter force against the spring, thereby enabling movement of the spring-loaded lock pin 410 away from the locked position to the unlocked position.

FIG. 16 is a cross section of the jaw 48 and actuator arm 46 of the present embodiment. Similar to FIG. 15, this figure shows the shaft portion 418 inserted into the cavity 412 of the actuator arm 46. The shaft portion 418 may have a tapered section 420 (e.g., conical) and a straight section 422 (e.g., cylindrical), which are configured to mate with a tapered interior surface 421 and a straight cylindrical interior surface 423 of the cavity 412. The tapered section 420 may serve to align the jaw 48 with the actuator arm 46 such that the jaw 48 does not move independently of the actuator arm 46. In other words, the engagement of the tapered section 420 of the jaw 48 with the tapered interior surface 421 of the actuator arm 46 provides a tight fit (e.g., a zero or nearly zero tolerance fit) while also self-aligning the jaw 48 relative to the actuator arm 46. For example, the interface between the tapered section 420 and the surface 421 is generally conical and coaxial about the axis 419, thereby causing the jaw 48 to gradually move toward the axis 419 during insertion. Simultaneously, the generally conical interface eventually closes any gap or interference between the jaw 48 and the actuator arm 46, such that the jaw 48 can be more securely held within the cavity 412 of the actuator arm 46.

In contrast, if a straight shaft fits within a straight cavity, then the diameter of the shaft is less than the diameter of the cavity. The difference in diameter substantially reduces or eliminates the possibility of locking, e.g., a condition where friction between the shaft and the cavity prevents the shaft from being inserted. By slightly reducing the diameter of the shaft, it may pass freely into the cavity. Unfortunately, the smaller diameter may result in some movement of the shaft within the cavity. Thus, the tapered (e.g., conical) interface between the tapered section 420 and the surface 421 substantially reduces or eliminates the possibility of movement of the jaw 48 relative to the actuator arm 46 once held in place by the spring-loaded lock pin 410.

In certain embodiments, the shaft portion 418 and the cavity 412 may be tapered at an angle 425 to substantially reduce or eliminate the possibility of shaft movement within a cavity. For example, the angle 425 may range between about 1 to 30 degrees, 1 to 20 degrees, 1 to 15 degrees, or 1 to 10 degrees. In certain embodiments, the angle 425 may range between about 5 to 10 degrees or at least greater than 7.5 degrees. The angle 425 may be a locking angle or a non-locking angle. A non-locking angle may be defined as an angle greater than approximately 7.5 degrees, where a shaft may be inserted into a cavity of substantially equal diameter without resistance. If the angle 425 of taper is a non-locking angle, then the diameter of the tapered section 420 of the shaft portion 418 and the tapered interior surface 421 of the cavity 412 may be substantially the same. In such an embodiment, the shaft portion 418 may not move within the cavity 412 because the diameters are substantially the same. In the present embodiment, the angle 425 of the tapered section 420 relative to the straight section 422 may be approximately 8 degrees. In this configuration, the shaft portion 418 may be inserted into the cavity 412 having substantially equal diameter without resistance, while limiting jaw movement relative to the actuator arm 46.

While the diameter of the tapered section 420 may be substantially the same as the tapered interior surface 421, the diameter of the straight section 422 may be slightly less than the straight cylindrical interior surface 423 to facilitate insertion. However, because the tapered section 420 forms a tight fit with the tapered interior surface 421 of the cavity 412, the jaw 48 may not significantly move with respect to the actuator arm 46 despite the smaller diameter of the straight section 422. The straight section 422 may ensure that an operator removes the jaw 48 along the axis 419 of the cavity 412.

As mentioned above, the jaw 48 may be secured to the actuator arm 46 by the spring-loaded lock pin 410. In the illustrated embodiment, the pin 410 is spring-biased or spring-loaded within a passage 427 along the axis 415 toward a locked position within a recess 424 in the annular wall 413 of the actuator arm 46. Upon extending into the recess 424, the spring-loaded lock pin 410 blocks axial movement of the jaw 48 along the axis 419. In other words, the pin 410 retains the jaw 48 within the cavity 412 of the actuator arm 46 until an opposite force (e.g., via tool 414) biases the pin 410 away from the recess 424.

The angle 417 of the pin 410 relative to the shaft portion 418 may be any suitable angle as discussed above. For example, the angle 417 may be a non-locking angle of at least 7.5 degrees. If the angle 417 is a non-locking angle, then the spring-loaded lock pin 410 may move along the axis 415 in and out of the recess 424 without any gap between the pin 410 and the passage 427. In such an embodiment, the lock pin 410 may hold the jaw 48 in place while minimizing any motion of the jaw 48 relative to the actuator arm 46 due to the substantial reduction or elimination of an interference gap.

The spring-loaded lock pin 410 may include a head 426, a spring 428, and a dowel 430 disposed within the passage 427. The head 426 may be threaded and serve to secure the pin 410 to the jaw 48 by screwing into a tapped hole 429 within the passage 427 of the jaw 48. By inserting a tool within a tool recess 432, the head 426 may be rotated to adjust its depth in the tapped hole 429 of the passage 427, thereby altering the position of the pin 410 relative to the jaw 48. The spring 428 may be coupled to the head 426 to bias the dowel 430 into its locked position in the recess 424. In certain embodiments, the depth of the head 426 may be adjusted and secured in position during assembly. For example, the manufacturer may tack weld the head 426 in place such that an operator may not vary head depth by rotating the head 426 via the tool recess 432.

In the illustrated embodiment, the passage 427 containing the spring-loaded lock pin 410 leads to a tool opening or receptacle 434 near the recess 424. The receptacle 434 and the recess 424 are located in a base region of the cavity 412. The receptacle 434 is angled relative to the passage 427 and the axes 415 and 419. For example, the receptacle 434 may have an angle 431 between the axis 415 of the passage 427 and an axis 433 of the receptacle 434. The angle 431 may range between about 0 to 90 degrees, 0 to 60 degrees, 0 to 45 degrees, 0 to 30 degrees, or 0 to 15 degrees. For example, the angle 431 may be about 15, 20, 25, 30, 35, 40, or 45 degrees, or any angle therebetween. The receptacle 434 enables insertion of the tool 414 to bias the pin 410 away from the recess 424, thereby releasing the jaw 48 from the actuator arm 46.

FIGS. 17 and 18 are cross-sectional views of an embodiment of the chuck 20, illustrating the process of removing the jaw 48 from the actuator arm 46. As can be seen in FIG. 17, the tool 414 may extend through the receptacle 434 to engage the dowel 430 and compress the spring 428 between the dowel 430 and the head 426. In particular, the tool 414 may extend linearly and pivotally into the receptacle 434 and the passage 427 as indicated by arrows 435. As the spring 428 compresses, the tool 414 moves the dowel 430 away from the recess 424 toward the head 426, as indicated by arrow 437. Once the spring 428 has been sufficiently compressed, the dowel 430 may no longer block movement of the jaw 48 away from the actuator arm 46. As a result, withdrawal of the dowel 430 out of the recess 424 enables movement and removal of the jaw 48 from the cavity 412 of the actuator arm 46.

FIG. 18 shows the jaw 48 separated from the actuator arm 46. As can been seen from this figure, once the jaw 48 has been removed, the spring-loaded lock pin 410 may return to its original length. After the jaw 48 has been separated, the jaw release tool 414 may be removed from the receptacle 434. At this point, a different jaw 48 may be secured to the actuator arm 46. Because of the rounded tip of the dowel 430 and the angle of the spring-loaded lock pin 410 relative to the shaft 418, inserting the jaw 48 into the actuator arm 46 may compress the spring 428 and allow translation of the jaw 48. However, when the dowel 430 reaches the recess 424, the spring 428 may uncompress, biasing the dowel 430 into the recess 424. Once the dowel 430 is inside the recess 424, the jaw 48 may not be removed from the actuator arm 46 without compressing the spring 428 with the jaw release tool 414.

FIG. 19 is a perspective view of an embodiment of the chuck 20, illustrating details of the recess 424 within the cavity 412 of the actuator arm 46. As can be seen in FIG. 19, the recess 424 may be contoured to fit the dimensions of the dowel 430. Furthermore, this figure illustrates that when the dowel 430 enters the recess 424, the contact may ensure that the jaw 48 is secured to the actuator arm 46, and may not be removed without compressing the spring 428. In addition, because the recess 424 is contoured to fit the dowel 430, the jaw may not rotate about the axis 419 of the shaft 418. In certain embodiments, the lock pin 410 may engage the recess 424 after axially inserting and rotating the jaw 48 within the cavity 412 until the pin 410 aligns with the recess 424. In other embodiments, the jaw 48 and actuator arm 46 may include one or more alignment features or guides (e.g., a guide pin and slot) to guide the jaw 48 into the cavity 412 in alignment between the pin 410 and the recess 424.

FIG. 20 is a perspective view of a sixth embodiment of the chuck 20 having quick-release jaws 48. In this embodiment, jaws 48 may be secured to actuator arms 46 by quick-release couplings, which include wedge-lock couplings 600. As discussed in detail below, the wedge-lock couplings 600 may extend at least partially through the actuator arms 46 and/or jaws 48 to secure these components together via a wedge-fit. In other words, each wedge-lock coupling 600 is configured to gradually wedge between each actuator arm 46 and respective jaw 48 to block separation, while also providing a very rigid connection. For example, each wedge-lock coupling 600 may include a path of travel between a release position and a lock position, wherein the path of travel is oriented at a convergence angle relative to an interface (e.g., a tangent line to an annular interface) between the actuator arm 46 and the jaw 48. In addition, each wedge-lock coupling 600 may have a wedge-shaped portion, which may be described as two surfaces meeting in an acute wedge angle. The convergence angle and the wedge angle may be the same or different from one another. These angles may range between approximately 5 to 85 degrees, 20 to 70 degrees, or 30 to 60 degrees. In certain embodiments, the angles may be greater than 0 and less than approximately 20, 25, 30, 35, 40, 45, or 50 degrees. For example, the angles may be approximately 10 to 20 degrees, or about 15 degrees.

Each wedge-lock coupling 600 is also configured to enable quick release of the jaw 48 from its respective actuator 46. For example, the quick-release of the wedge-lock coupling 600 may enable quick swapping with a different type, size, or configuration of a jaw 48. In certain embodiments, the wedge-lock coupling 600 may enable multiple mounting positions of the jaw 48 on the actuator arm 46. These different mounting positions may include different circumferential positions (e.g., different rotational positions about an axis) of the jaw 48 relative to the actuator arm 46. As illustrated in FIG. 20, each jaw 48 is mounted to its respective actuator arm 46 in an inwardly facing orientation, thereby enabling work holding of an exterior of a work piece 602. In the disclosed embodiment, the wedge-lock coupling 600 enables a reversed mounting position of each jaw 48 on its respective actuator arm 46. In other words, the jaw 48 may be mounted either in the illustrated inwardly facing orientation or a diametrically opposite outwardly facing orientation, thereby enabling the jaws 48 to hold an interior of a work piece. The multiple mounting positions of the wedge-lock coupling 600 are discussed in further detail below.

FIG. 21 is a partial perspective view of an embodiment of the chuck 20 of FIG. 20, illustrating the actuator arm 46, the jaw 48, and the sixth quick-release mechanism (e.g., the wedge-lock coupling 600) exploded from one another. In the illustrated embodiment, the wedge-lock coupling 600 includes a tool portion 604, a wedge portion 606, and a guide post 608. As discussed in detail below, the tool portion 604 is rotatable to cause axial movement of the wedge portion 606 along a path of travel between a release position and a lock position, wherein a locking direction along the path of travel gradually wedges the wedge portion 606 between the actuator arm 46 and the jaw 48. In addition, the tool portion 604 interacts with the guide post 608 to block axial movement of the tool portion 604 while enabling rotation of the tool portion 604 and axial movement of the wedge portion 606. Again the wedge portion 606 and/or the path of travel may have an angle between approximately 5 to 85 degrees (e.g., 10 to 20 degrees) to create a wedge fit between the actuator arm 46 and the jaw 48.

The tool portion 604 includes a tool head 610 and a guide wheel 612. The tool head 610 may include a variety of tool engageable protrusions and/or recesses, such as a male hex head as illustrated in FIG. 21. The guide wheel 612 includes an annular groove 614 disposed between opposite circular discs 616. Thus, the guide wheel 612 has a generally cylindrical shape. In certain embodiments, each circular disc 616 has includes an O-ring seal to block contaminants. In addition, the tool portion 604 includes a first threaded portion 618, e.g., an internally threaded bore inside the tool head 610 and/or the guide wheel 612.

The wedge portion 606 has a second threaded portion 620 (e.g., an externally threaded shaft) coupled to a ram 622. The second threaded portion 620 is configured to mate with the first threaded portion 618 of the tool portion 604. The ram 622 includes a front end 624, a rear end 626, a cylindrical side wall 628, and a tapered locking surface 630 interrupting the cylindrical side wall 628. As illustrated, the tapered locking surface 630 converges toward an axis 632 of the wedge portion 606 in a forward direction from the rear end 626 to the front end 624. In certain embodiments, an angle 634 of this tapered locking surface 630 may range between approximately 5 to 45 degrees, 5 to 30 degrees, or 10 to 20 degrees (e.g., about 15 degrees). As further illustrated, the tapered locking surface 630 includes a plurality of teeth 636 elongated in the forward direction along the axis 632, wherein each tooth has a V-shaped profile. However, any suitable number, profile, and arrangement of teeth 636 may be disposed along the tapered locking surface 630. For example, the tapered locking surface 630 may exclude the teeth 636, or may include any number of teeth 636 from 1 to 10 or greater.

The guide post 608 includes a cylindrical shaft 638 having a tool head 640 and a threaded portion 642 (e.g., external threads) on opposite ends of the shaft 638. As discussed in further detail below, the cylindrical shaft 638 extends along a portion of the annular groove 614 (i.e., along a tangent line) to block axial movement of the tool portion 604. Together, the guide post 608 and the guide wheel 612 may be described as a guide 644. The guide post 608 and the guide wheel 612 cooperate with one another to simultaneously limit axial movement of the guide wheel 612 (and thus the tool portion 604), while also enabling rotation of the tool portion 604 and enabling axial movement of the wedge portion 606.

In the illustrated embodiment, the jaw 48 includes features to support the wedge-lock coupling 600 along a path of travel between a release position and a lock position, and the actuator arm 46 includes features to interface with the wedge-lock coupling 600 at the lock position to secure the jaw 48 to the arm 46. As illustrated, the actuator arm 46 includes a male connector or arm post 650 extending outwardly from a base flange 652 to a peripheral end 654. The arm post 650 has a cylindrical side wall 656 that is interrupted by first and second flat side walls 658 and 660 on diametrically opposite sides of the post 650. In other words, the first and second flat side walls 658 and 660 are circumferentially offset by approximately 180 degrees about an arm axis 662 of the arm post 650. As illustrated, the first and second flat side walls 658 and 660 are parallel to one another, as well as the arm axis 662. The first flat side wall 658 includes a first plurality of teeth 664, and the second flat side wall 660 includes a second plurality of teeth 666. As illustrated, the teeth 664 and 666 are elongated in a direction extending crosswise (e.g., perpendicular) to the arm axis 662, wherein each tooth has a V-shaped profile. However, any suitable number, profile, and arrangement of teeth 664 and 666 may be disposed along the first and second flat side walls 658 and 660. For example, the first and second flat side walls 658 and 660 may exclude the teeth 664 and 666, or may include any number of teeth 664 and 666 from 1 to 10 or greater.

In certain embodiments, one or more guides may be provided to assist with alignment between the actuator arm 46 and the jaw 48. For example, the illustrated arm post 650 includes a pair of diametrically opposite guide pins 668 and 670 disposed on the peripheral end 654 in alignment with the first and second flat side walls 658 and 660. These guide pins 668 and 670 are configured to mate with guide receptacles 676 and 678 in the jaw 48.

The jaw 48 includes an arm bore 684 configured to mate with the arm post 650 along an annular interface. The arm bore 684 extends into the jaw 48 from a base 686 toward a top 688, wherein the arm bore 684 has a cylindrical side wall 690 and a flat disc-shaped top 692. The guide receptacles 676 and 678 are disposed in the flat disc-shaped top 692 in first and second positions, which are diametrically opposite from one another relative to a bore axis 694. Thus, the diametrically opposite positions of the guide pins 668 and 670 in the arm post 650 in combination with the diametrically opposite positions of the guide receptacles 676 and 678 in the jaw 48 may facilitate proper positioning of the wedge-lock coupling 600 relative to the arm post 650. For example, the diametrically opposite positions may enable reversible mounting of the jaw 48 to the actuator arm 46, while guiding the teeth 636 of the wedge-lock coupling 600 to mate with either the teeth 664 or the teeth 666 on the arm post 650.

The jaw 48 also includes a wedge-lock bore 696 (e.g., a cylindrical bore) extending at least partially through the jaw 48 from a first side wall 698 toward a second side wall 700, wherein the wedge-lock bore 696 intersects the arm bore 684 inside the jaw 48. As discussed below, the wedge-lock bore 696 supports the wedge-lock coupling 600, and enables the wedge portion 606 to move along a path of travel inside the wedge-lock bore 696 in response to rotation of the tool portion 604. At the intersection, the arm bore 684 and the wedge-lock bore 696 define an interface opening 702 to enable the wedge-lock coupling 600 (e.g., wedge portion 606) to interface with the arm post 650. In the illustrated embodiment, the wedge-lock bore 696 has an axis 704 oriented crosswise to the bore axis 694 of the arm bore 684. For example, the axis 704 may extend along a plane that is parallel to the base 686, while the bore axis 694 extends perpendicular to the base 686. Furthermore, as discussed in further detail below, the axis 704 of the wedge-lock bore 696 may be parallel or angled (e.g., a convergence angle) relative to a tangent line of the arm bore 684. In other words, the axis 704 of the wedge-lock bore 696 may be angled (e.g., a convergence angle) relative to the first flat side wall 658 or the second flat side wall 660 of the arm post 650. The convergence angle may range between 5 to 85 degrees, 20 to 70 degrees, 30 to 60 degrees, 5 to 45 degrees, 5 to 30 degrees, or 10 to 20 degrees.

The jaw 48 and the wedge-lock coupling 600 may include one or more guides to facilitate movement of the wedge-lock coupling 600. For example, the wedge-lock bore 696 includes a guide receptacle 672 configured to receive a guide pin 674, which may be secured partially into the wedge-lock bore 696 to engage a guide slot 680 extending axially along the wedge portion 606. The engagement between the guide pin 674 and the guide slot 680 blocks rotation of the wedge portion 606, while enabling axial movement of the wedge portion 606 along the wedge-lock bore 696. In addition, the jaw 48 includes a guide post bore 706 (e.g., a cylindrical bore) extending at least partially through the jaw 48 from the base 686 toward the top 688, wherein the guide post bore 706 intersects the wedge-lock bore 696 inside the jaw 48. The guide post bore 706 includes a shaft bore 708, a threaded portion 710, and a head recess 712. At the intersection, the guide post bore 706 and the wedge-lock bore 696 define an interface opening 714 to enable the wedge-lock coupling 600 (e.g., guide wheel 612) to interface with the guide post 608. Thus, the guide post 608 extends into the annular groove 614 of the guide wheel 612 when installed into the guide post bore 706. In the illustrated embodiment, the guide post bore 706 has an axis 716 oriented crosswise to the axis 704 of the wedge-lock bore 696. For example, the axis 716 may extend along a plane that is parallel to the annular groove 614 of the guide wheel 612, and thus perpendicular to the axis 704.

FIG. 22 is a partial perspective view of an embodiment of the chuck 20 of FIG. 20, illustrating the sixth quick-release mechanism (e.g., the wedge-lock coupling 600) installed in the jaw 48, and illustrating the jaw 48 exploded from the actuator arm 46. As illustrated, the tool portion 604 and the wedge portion 606 are disposed in a series arrangement along the axis 704 inside the wedge-lock bore 696, and are coupled together via threaded engagement of the first and second threaded portions 618 and 620. The guide post 608 is disposed inside the guide post bore 706, such that a portion of the guide post 608 extends through the interface opening 714 into the annular groove 614 of the guide wheel 612. Thus, the guide post 608 blocks axial movement of the tool portion 604 while enabling rotation of the tool portion 604. As discussed in further detail below, a first rotational direction of the tool portion 604 causes the first threaded portion 618 of the tool portion 604 to advance relative to the second threaded portion 620 of the wedge portion 606, whereas a second rotational direction of the tool portion 604 causes the first threaded portion 618 of the tool portion 604 to withdraw relative to the second threaded portion 620 of the wedge portion 606. Thus, the wedge portion 606 may have a path of travel along the axis 704 between a release position (not shown) and a lock position (as shown), wherein the release position has the tapered locking surface 630 and teeth 636 retracted axially away from the interface opening 702, and the lock position has the tapered locking surface 630 and teeth 636 advanced axially into the interface opening 702. In the present embodiment, the guide slot 680 of the wedge portion 606 engages the guide pin 674 during axial movement along the wedge-lock bore 696, thereby blocking rotation of the wedge portion 606. In other words, the guide pin 674 and the guide slot 680 enable only axial movement (without rotation) of the wedge portion 606 along the axis 704 between the release position and the lock position.

FIG. 23 is a partial perspective view of an embodiment of the chuck 20 of FIG. 20, illustrating the jaw 48 coupled to the actuator arm 46 via the sixth quick-release mechanism (e.g., wedge-lock coupling 600). As illustrated, the wedge-lock coupling 600 is disposed in a lock position, wherein the wedge portion 606 is wedge-fit between the jaw 48 and the actuator arm 46. As a user rotates the tool portion 604 in a first rotational direction 720, the threaded engagement between the tool portion 604 and the wedge portion 606 causes the wedge portion 606 to move in an inward axial direction 722 from a release position toward a lock position as shown in FIG. 23, while the guide wheel 612 and the guide post 608 block axial movement of the tool portion 604. In the inward axial direction 722, the wedge portion 606 gradually engages the first flat side wall 658 due to the angle 634 of the tapered locking surface 630 and/or the convergence angle of the wedge-lock bore 696 relative to the first flat side wall 658. As discussed above, these angles may range between approximately 5 to 85 degrees, e.g. approximately 10 to 20 degrees. Thus, the wedge portion 606 gradually increases the forces between the jaw 48 and the actuator arm 46 as the wedge portion 606 continues to move in the inward axial direction 722. The wedge fit, due to the increased forces, substantially increases the rigidity of the connection between the jaw 48 and the arm 46. In addition, the wedge portion 606 engages the teeth 636 with the first plurality of teeth 664 on the first flat side wall 658 of the arm post 650. As appreciated, the teeth 636, 664, and 666 are oriented crosswise to the axis 662 of the arm post 650 and the axis 694 of the arm bore 684. As a result, engagement of the teeth 636 and 666 blocks axial separation of the jaw 48 from the actuator arm 46.

Likewise, as a user rotates the tool portion 604 in a second rotational direction 724, the threaded engagement between the tool portion 604 and the wedge portion 606 causes the wedge portion 606 to move in an outward axial direction 726 from the lock position toward the release position, while the guide wheel 612 and the guide post 608 block axial movement of the tool portion 604. Thus, the interface between the guide wheel 612 and the guide post 608 retains the tool portion 604 and the wedge portion 606 inside the wedge-lock bore 696 over the path of travel between the release position and the lock position. After moving the wedge portion 606 to the release position, the user may remove the jaw 48 from the actuator arm 46. After removal of the jaw 48, the user may install a different jaw or reinstall the same jaw 48 in a reversed orientation. For example, the user may rotate the jaw 48 (e.g., 180 degrees) and reinstall the jaw 48 onto the actuator arm 46, such that the wedge-lock coupling 600 mates with the second flat side wall 660 and the second plurality of teeth 666. The reversed orientation of the jaw 48 may be useful for holding an interior of a work piece rather than an exterior of a work piece.

FIG. 24 is a cross-sectional view of an embodiment of the chuck 20 of FIG. 20, illustrating the wedge-lock coupling 600 disposed between the jaw 48 and the actuator arm 46 in a lock position. In the illustrated lock position, the wedge-lock coupling 600 is disposed radially between the arm post 650 and the jaw 48, and the teeth 636 of the wedge portion 606 are engaged with the first plurality of teeth 664 of the arm post 650. As discussed above, the teeth 636, 664, and 666 are oriented crosswise (e.g., perpendicular) to the axes 662 and 694, thereby blocking axial movement of the jaw 48 relative to the arm post 650. Upon disengaging the teeth 636 and 664, the jaw 48 may be removed from the arm post 650, and optionally reinstalled in a reverse orientation (e.g., 180 degrees about the axes 662 and 694). For example, the jaw 48 may be reinstalled with the teeth 636 of the wedge portion 606 engaged with the second plurality of teeth 666. During axial movement of the wedge portion 606 between the lock position and the release position, the guide pin 674 moves axially along the guide slot 680 on the wedge portion 606. Again, the engagement of the guide pin 674 with the guide slot 680 blocks rotation of the wedge portion 606, thereby enabling the threaded engagement between the tool portion 604 and the wedge portion 606 to cause axial movement of the wedge portion 606 relative to the tool portion 604.

FIG. 25 is a cross-sectional view of an embodiment of the chuck 20 of FIG. 20, illustrating three sets of jaws 48, actuator arms 46, and wedge-lock couplings 600 in different states. In particular, the different states include a release position of the wedge-lock coupling 600 as indicated by a first gap state 730 (e.g., no gap) of the wedge portion 606 relative to the tool portion 604, a transition position of the wedge-lock coupling 600 as indicated by a second gap state 732 (e.g., partial gap) of the wedge portion 606 relative to the tool portion 604, and a lock position of the wedge-lock coupling 600 as indicated by a third gap state 734 (e.g., full gap) of the wedge portion 606 relative to the tool portion 604. As illustrated by the three different sets, the wedge portion 606 has an axial path of travel between the first gap state 730 and the third gap state 734, which is responsive to rotation of the tool portion 604.

Again, as a user rotates the tool head 610, the guide wheel 612 rotates the annular groove 614 along the guide post 608 to block axial movement of the tool portion 604, while also allowing the first threaded portion 618 of the tool portion 604 to rotate relative to the second tool portion 620 of the wedge portion 606. During this rotation, the guide pin 674 engages the guide slot 680 in the wedge portion 606 to block rotational movement of the wedge portion 606, while also allowing axial movement of the wedge portion 606. As a result, the first and second threaded portions 618 and 620 are able to advance or withdraw relative to one another, thereby moving the wedge portion 606 in an axial direction relative to the tool portion 604.

As illustrated, the wedge portion 606 moves along the axis 704 of the wedge-lock bore 696, which is oriented at a convergence angle 736 relative to an interface 738 between the wedge portion 606 and the arm post 650. In the illustrated embodiment, the interface 738 resides between the first flat side wall 658 (including teeth 664) of the arm post 650 and the tapered locking surface 630 (including teeth 636) of the wedge portion 606. Thus, the tapered locking surface 630 and the axis 704 both have the convergence angle 736, which facilitates a wedge fit between the jaw 48 and the actuator arm 46. As discussed above, the convergence angle 736 may range between approximately 5 to 85 degrees, 20 to 70 degrees, or 30 to 60 degrees. In certain embodiments, the convergence angle 736 may be greater than 0 and less than approximately 20, 25, 30, 35, 40, 45, or 50 degrees. For example, the convergence angle 736 may be approximately 10 to 20 degrees, or about 15 degrees.

In certain embodiments, one or more seals (e.g., O-rings) may be disposed between the wedge-lock coupling 600 and the wedge-lock bore 696. For example, each circular disc 616 of the guide wheel 612 may include an O-ring seal to block contaminants from entering the wedge-lock bore 696. The O-ring seals may be fixed or rotational relative to the guide wheel 612. In one embodiment, the O-ring seals may be fixed in an annular groove in the wedge-lock bore 696 in position concentric with the circular discs 616 of the guide wheel 612, In another embodiment, the O-ring seals may be fixed in annular grooves in the circular discs 616 of the guide wheel 612, such that the O-ring seals rotate with the guide wheel 616 along the interior surface of the wedge-lock bore 696.

FIG. 26 is a partial cross-sectional view of an embodiment of a chuck 20 having a seventh actuator arm assembly utilizing a seventh quick-release mechanism with a wedge-lock coupling 750. In the illustrated embodiment, the wedge-lock coupling 750 includes a tool portion 752 and a wedge portion 754. As discussed in detail below, the tool portion 752 is rotatable to cause axial movement of the wedge portion 754 along a path of travel between a release position and a lock position, wherein a locking direction along the path of travel gradually wedges the wedge portion 754 between the actuator arm 46 and the jaw 48. Again the wedge portion 754 and/or the path of travel may have an angle between approximately 5 to 85 degrees (e.g., 10 to 20 degrees) to create a wedge fit between the actuator arm 46 and the jaw 48.

In the illustrated embodiment, the tool portion 752 extends through the wedge portion 754, and is rotatable relative to the wedge portion 754. The tool portion 752 includes a shaft 756, a tool head 758, and a first threaded portion 760. The shaft 756 may be a cylindrical shaft without threads, whereas the first threaded portion 760 may be a cylindrical shaft with threads. The tool head 758 may include an internal or external tool engageable feature, such as an internal hex recess or an external hex protrusion. In certain embodiments, the tool portion 752 may include a seal, such as an O-ring seal, disposed about the shaft 756. The seal blocks contaminants from passing through the wedge portion 754.

The wedge portion 754 includes a front end 762, a rear end 764, a cylindrical side wall 766, and a tapered locking surface 768 interrupting the cylindrical side wall 766. As illustrated, the tapered locking surface 768 converges toward an axis 770 of the wedge portion 754 in a forward direction from the rear end 764 to the front end 762. In certain embodiments, an angle 772 of this tapered locking surface 768 relative to the axis 770 may range between approximately 5 to 85, 5 to 45 degrees, 5 to 30 degrees, or 10 to 20 degrees (e.g., about 15 degrees). As further illustrated, the tapered locking surface 768 includes a plurality of teeth 774 elongated in the forward direction along the axis 770, wherein each tooth has a V-shaped profile. However, any suitable number, profile, and arrangement of teeth 774 may be disposed along the tapered locking surface 768. For example, the tapered locking surface 768 may exclude the teeth 774, or may include any number of teeth 774 from 1 to 10 or greater.

In addition, the wedge portion 754 includes an interior bore 776 and a recess 778 between the rear end 764 and the front end 762. The interior bore 776 supports the shaft 756 of the tool portion 752, while the recess 778 supports the tool head 758 of the tool portion 752. As discussed above, a seal (e.g., an O-ring seal) may be disposed between the shaft 756 and the interior bore 776 to block passage of contaminants through the wedge portion 754, thereby protecting the first and second threaded portions 760 and 792. The wedge-lock coupling 750 also includes a retainer 780 (e.g., a C-shaped retainer clip) disposed in a groove 782 (e.g., annular groove) of the recess 778. The retainer 780 blocks axial movement of the tool portion 752 relative to the wedge portion 754, thereby holding these portions 752 and 754 in an assembly that is rotatable relative to one another. As illustrated, the tool head 758 is disposed at the rear end 764 of the wedge portion 754, while the first threaded portion 760 protrudes outwardly from the front end 762 of the wedge portion 754.

The wedge-lock coupling 750 is disposed in a wedge-lock bore 784 extending at least partially through the jaw 48, such that the bore 784 intersects the arm bore 684 of the jaw 48. In certain embodiments, a seal (e.g., an O-ring seal) may be disposed between the wedge-lock coupling 750 and the wedge-lock bore 784, thereby blocking contaminants from reaching the interface between the wedge portion 754 (e.g., teeth 774) and the arm post 650 (e.g., teeth 664). The illustrated bore 784 includes a retainer 786 (e.g., a C-shaped retainer clip) disposed in a groove 788 (e.g., annular groove). The retainer 786 blocks axial movement of the wedge-lock coupling 750, thereby holding the wedge-lock coupling 750 in an assembly within the bore 784 of the jaw 48. Inside the jaw 48, the wedge-lock bore 784 extends to a reduced bore 790 having a second threaded portion 792 (e.g., internal threads). In the illustrated embodiment, the first threaded portion 760 of the tool portion 752 mates with the second threaded portion 792 of the reduced bore 790. Thus, upon rotation of the tool portion 752, the threaded engagement between first and second threaded portions 760 and 792 enables axial movement of the wedge portion 754 along the axis 770 of the wedge-lock bore 784. As discussed below, the wedge portion 754 includes an anti-rotation feature to enable axial movement and block rotational movement of the wedge portion 754, as the user rotates the tool portion 752.

In the illustrated embodiment, the arm post 650 is similar to the embodiment of FIGS. 20-25, except that the arm post 650 excludes the guide pins 668 and 670, and the arm post 650 excludes the second flat side wall 660 with the second plurality of teeth 666. Thus, the illustrated arm post 650 does not allow reversible mounting of the jaw 48. However, the arm post 650 includes the first flat side wall 658 with the first plurality of teeth 664, such that the jaw 48 may be coupled with the wedge-lock coupling 750. In certain embodiments, the jaw 48 with the wedge-lock coupling 750 may be used with the arm post 650 of FIGS. 20-25 to provide reversible mounting positions as discussed in detail above. Likewise, the jaw 48 with the wedge-lock coupling 600 of FIGS. 20-25 may be used with the arm post 650 of FIG. 26 for mounting in a single orientation.

FIG. 27 is a cross-sectional view of an embodiment of the chuck 20 of FIG. 26, illustrating the wedge-lock coupling 750 disposed between the jaw 48 and the actuator arm 46 in a lock position. In the illustrated lock position, the wedge-lock coupling 750 is disposed radially between the arm post 650 and the jaw 48, and the teeth 774 of the wedge portion 754 are engaged with the teeth 664 of the arm post 650. As illustrated, the teeth 664 and 774 are oriented crosswise (e.g., perpendicular) to the axes 662 and 694, thereby blocking axial movement of the jaw 48 relative to the arm post 650. Upon disengaging the teeth 664 and 774, the jaw 48 may be removed from the arm post 650 and replaced with a different jaw.

In the illustrated embodiment, the wedge-lock coupling 750 includes an axial guide feature between the wedge portion 754 and the wedge-lock bore 784. In particular, the wedge portion 754 includes an axial slot 800, which mates with an axial protrusion 802 extending lengthwise along the wedge-lock bore 784. During axial movement of the wedge portion 754 between the lock position and the release position, the axial slot 800 moves axially along the axial protrusion 802 to block rotation of the wedge portion 754. The anti-rotation of the wedge portion 754 enables proper alignment between the tapered locking surface 768 and teeth 774 of the wedge portion 754, and the first flat side wall 658 and teeth 664 of the arm post 650.

FIG. 28 is a cross-sectional view of an embodiment of the chuck 20 of FIG. 26, illustrating three sets of jaws, actuator arms, and wedge-lock couplings in different states. In particular, the different states include a release position of the wedge-lock coupling 750 as indicated by a first gap state 810 (e.g., no gap) of the wedge portion 754 relative to the retainer 786, a transition position of the wedge-lock coupling 750 as indicated by a second gap state 812 (e.g., partial gap) of the wedge portion 754 relative to the retainer 786, and a lock position of the wedge-lock coupling 750 as indicated by a third gap state 814 (e.g., full gap) of the wedge portion 754 relative to the retainer 786. As illustrated by the three different sets, the wedge portion 754 has an axial path of travel between the first gap state 810 and the third gap state 814, which is responsive to rotation of the tool portion 752. Again, as a user rotates the tool head 758, the first and second threaded portions 760 and 792 engage one another to impart axial movement of the wedge portion 754. The wedge portion 754 is only able to move in an axial direction (i.e., no rotation) due to the axial slot 800 and the axial protrusion 802.

As illustrated, the wedge portion 754 moves along the axis 770 of the wedge-lock bore 784, which is oriented at the convergence angle 772 relative to an interface 816 between the wedge portion 754 and the arm post 650. In the illustrated embodiment, the interface 816 resides between the first flat side wall 658 (including teeth 664) of the arm post 650 and the tapered locking surface 768 (including teeth 774) of the wedge portion 754. Thus, the tapered locking surface 768 and the axis 770 both have the convergence angle 772, which facilitates a wedge fit between the jaw 48 and the actuator arm 46. As discussed above, the convergence angle 772 may range between approximately 5 to 85 degrees, 20 to 70 degrees, or 30 to 60 degrees. In certain embodiments, the convergence angle 772 may be greater than 0 and less than approximately 20, 25, 30, 35, 40, 45, or 50 degrees, For example, the convergence angle 772 may be approximately 10 to 20 degrees, or about 15 degrees.

FIG. 29 is a partial cross-sectional view of an embodiment of a wedge-lock coupling (e.g., 600, 750), illustrating teeth (e.g., 636, 774) having an offset 820 to bias the jaw 48 inwardly toward the actuator arm 46, as indicated by arrow 822. For example, FIG. 29 may correspond to a small section of the embodiment shown in FIG. 24, or a small section of the embodiment shown in FIG. 27. As illustrated, the teeth (e.g., 636, 774) engage one another on the inwardly facing side of the teeth as indicated by arrow 822, rather than an outwardly facing side of the teeth. As the wedge-lock couplings (e.g., 600, 750) are driven into engagement with the actuator arm 46, the offset 820 causes the teeth (e.g., 636, 774) to pull the jaw 48 gradually against the actuator arm 46, thereby increasing the axial retention force of the jaw 48 against the actuator 46. Thus, the wedge-lock couplings (e.g., 600, 750) provide both an increased axial retention force due to the offset 820 between the teeth (e.g., 636, 774), and also an increased radial/circumferential retention force due to the wedge fit of the wedge portion (e.g., 606, 754) between the jaw 48 and the actuator arm 46.

In any of the foregoing embodiments, additional weight savings may be obtained by employing a hybrid chuck body. This type of chuck body may have a core and shell, where the core is made of a composite material and the shell is made of metal. The combination of employing the present embodiment with the hybrid chuck body may produce a weight savings of approximately 38% compared to prior chuck configurations. Lighter chucks may consume less energy to accelerate, resulting in power savings and improved motor longevity. In addition, lighter chucks may facilitate the use of smaller motors to drive the chuck 20. These smaller motors may reduce the cost of the machining apparatus, typically a lathe.

The quick-release mechanism and the unitary non-split upper bearing of the disclosed embodiments can be used together or separately in new chuck assemblies or can be used together or separately to retrofit existing chuck assemblies not having these features. To facilitate this, kits can be sold to upgrade the existing chuck assemblies. In particular, as shown in FIG. 5, a retrofit kit 500 can include the actuator arm 46, the homing mechanism 120, the seal ring assembly 84, the front bearing assembly 80, the quick-release mechanism 160, and the jaw 48. The jaw 48 can be provided as a blank to be machined by the purchaser for the particular workpiece to be held or can be pre-machined in the desired configuration to hold a workpiece. Optionally, the retrofit kit 500 can include the end cap 70 and the spring 72. It should be appreciated that the quick-release mechanism included in the retrofit kit 500 can be any of the quick-release mechanisms described herein. Furthermore, if desired, in lieu of a quick-release mechanism, the retrofit kit 500 can be configured to use a single-threaded fastener 406 to retain a jaw to the associated actuator arm. Thus, the retrofit kit 500 can be used to retrofit an existing chuck assembly to provide the benefits of a unitary non-split upper bearing and/or a quick-release mechanism and/or a single fastener attaching method.

The workholding chuck according to the disclosed embodiments is suitable for use in a high-speed application. For example, the chuck according to the disclosed embodiments can be used on a lathe or other machining apparatus that rotates the chuck assembly at speeds in excess of 3,000 RPM. It should be appreciated, however, that the chuck assembly can be used on lower-speed applications, although all the benefits of the disclosed embodiments may not be realized. Additionally, it should be appreciated that the quick-release mechanisms and the non-split unitary front bearing of the disclosed embodiments can be used together or separately. Additionally, the quick-release mechanisms and/or the non-split unitary front bearing can be used with actuator arms that are driven by other means than the actuator plate 30 disclosed herein. For example, the non-split unitary bearing and/or quick-release mechanism of the disclosed embodiments can be used on an actuator arm disposed in an equalizing chuck, such as that shown in U.S. Pat. No. 6,655,699, entitled "Six Jaw Equalizing Chuck," the disclosure of which is incorporated herein by reference in its entirely. Moreover, while the disclosed embodiments have a chuck with three actuating arms and three jaws, it should be appreciated that more or less than three actuator arms and/or jaws can be used. Thus, while the disclosed embodiments have been described with reference to particular illustrations and figures, it should be appreciated that changes can be made to that shown without deviating from the present disclosure. Thus, the description is merely exemplary in nature and variations are not to be regarded as a departure from the spirit and scope of the disclosed embodiments.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a jaw comprising a first bore and a second bore, wherein the first bore is configured to couple to an arm of a work-holding chuck along a first axis, the second bore has a second axis disposed in a plane crosswise to the first axis, and the second bore gradually converges toward the first bore at a convergence angle of approximately 5 to 85 degrees; and
a wedge-lock coupling disposed in the second bore, wherein the wedge-lock coupling comprises a wedge portion having a locking surface tapered relative to the second axis, the locking surface comprises a plurality of teeth elongated along the second axis, and the wedge portion is movable along the second bore.

2. The system of claim 1, wherein wedge-lock coupling comprises a tool portion coupled to the wedge portion, and the tool portion is rotatable to cause movement of the wedge portion along the second bore.

3. The system of claim 2, wherein the tool portion comprises a first threaded portion coupled to a second threaded portion of the wedge portion, and the wedge-lock coupling comprises a guide configured to enable rotation and block axial movement of the tool portion.

4. The system of claim 3, wherein the guide comprises a wheel having an annular groove coaxial with the tool portion, the wheel is coupled to the tool portion, the guide comprises a post coupled to the jaw, and the post extends tangent to the annular groove.

5. The system of claim 2, wherein the tool portion comprises a shaft having a tool head and a first threaded portion disposed on opposite ends of the shaft, the shaft extends through an interior bore in the wedge portion, and the first threaded portion is coupled to a second threaded portion in the jaw.

6. The system of claim 1, wherein:
the plurality of teeth comprise a first plurality of teeth; and
the system further comprises:
an actuator arm configured to couple to a work-holding chuck, wherein the actuator arm comprises:
a first flat side wall having a second plurality of teeth oriented crosswise relative to an axis of the actuator arm, wherein the actuator arm is configured to retain the jaw in a first orientation via engagement between the first plurality of teeth and second plurality of teeth; and a second flat side wall having a third plurality of teeth oriented crosswise to the axis of the actuator arm; wherein the actuator arm is configured to retain the jaw in a second orientation via engagement between the first plurality of teeth and third plurality of teeth.

7. The system of claim 6, wherein the first and second flat side walls are disposed on diametrically opposite sides of the actuator arm, and the first and second orientations are reversed by 180 degrees about an axis of the actuator arm.

8. The system of claim 6, wherein the wedge portion has a path of travel between a release position and a lock position, and a locking direction along the path of travel gradually wedges the wedge portion between the actuator arm and the jaw.

9. A chuck shaped and configured to be rotated by a drive, wherein the chuck comprises:

a jaw; and a wedge-lock coupling configured to couple the jaw to an actuator arm, wherein the wedge-lock coupling comprises:

a wedge portion having a path of travel between a release position and a lock position, wherein a locking direction along the path of travel is configured to gradually wedge the wedge portion between the actuator arm and the jaw;

an axis along the path of travel, wherein the wedge portion comprises a locking surface tapered relative to the axis; and a first plurality of teeth disposed on the locking surface, wherein the first plurality of teeth are configured to engage a second plurality of teeth of the actuator arm when the wedge portion is in the lock position.

10. The chuck of claim 9, further comprising the actuator arm comprising the second plurality of teeth.

* * * * *